(12) United States Patent
Collinge et al.

(10) Patent No.: US 11,997,190 B2
(45) Date of Patent: May 28, 2024

(54) CREDENTIAL MANAGEMENT IN DISTRIBUTED COMPUTING SYSTEM

(71) Applicant: MASTERCARD INTERNATIONAL INCORPORATED, Purchase, NY (US)

(72) Inventors: Mehdi Collinge, Mont-Sainte-Aldegonde (BE); Omar Laazimani, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1 day.

(21) Appl. No.: 17/616,303

(22) PCT Filed: Apr. 22, 2020

(86) PCT No.: PCT/US2020/029187
§ 371 (c)(1),
(2) Date: Dec. 3, 2021

(87) PCT Pub. No.: WO2020/247092
PCT Pub. Date: Dec. 10, 2020

(65) Prior Publication Data
US 2022/0321336 A1  Oct. 6, 2022

(30) Foreign Application Priority Data

Jun. 5, 2019 (EP) ..................................... 19178579
Jun. 5, 2019 (EP) ..................................... 19178583

(51) Int. Cl.
*H04L 9/08* (2006.01)
*H04L 9/32* (2006.01)
*H04L 9/40* (2022.01)

(52) U.S. Cl.
CPC ............ *H04L 9/0819* (2013.01); *H04L 9/085* (2013.01); *H04L 9/0858* (2013.01);
(Continued)

(58) Field of Classification Search
CPC . H04L 9/32; H04L 9/08; H04L 9/0861; H04L 9/0858; H04L 9/085; H04L 9/0819; H04L 9/0846; H04L 9/14; H04L 63/06
See application file for complete search history.

(56) References Cited

U.S. PATENT DOCUMENTS 7,571,230 B2   8/2009  Gissel et al.
8,463,894 B2   6/2013  Chen
(Continued)

FOREIGN PATENT DOCUMENTS

CA   2944361 A1   10/2015
CN   106462544 A    2/2017
(Continued)

OTHER PUBLICATIONS

International Search Report and Written Opinion for International Patent Application No. PCT/US2020/029187, dated Jun. 18, 2020, 7 pages.
(Continued)

*Primary Examiner* — Shaqueal D Wade-Wright
(74) *Attorney, Agent, or Firm* — Jordan IP Law, LLC

(57) ABSTRACT

A computing node in a distributed information security system, wherein the computing node is adapted to communicate with a subset of clients of the distributed information security system, wherein the computing node provides at least one cryptographic service for the clients of the subset, wherein the computing node is provisioned with a plurality of keys for use by said at least one cryptographic service, wherein the computing node is adapted to associate a key from the plurality of keys to a service request for a client according to a deterministic process based on one or more data associated with the client. A distributed information security system comprising a plurality of such nodes is also
(Continued)

described, together with a method of providing a cryptographic service at such a computing node.

20 Claims, 23 Drawing Sheets

(52) U.S. Cl.
CPC .............. *H04L 9/0861* (2013.01); *H04L 9/32* (2013.01); *H04L 63/06* (2013.01)

(56) References Cited

U.S. PATENT DOCUMENTS

| | | | |
|---|---|---|---|
| 10,038,619 | B2 | 7/2018 | Mercuri |
| 10,078,571 | B2 | 9/2018 | Altman et al. |
| 10,313,117 | B1* | 6/2019 | Carlough ................ H04L 9/302 |
| 10,467,422 | B1* | 11/2019 | Roth ....................... G06F 21/602 |
| 10,812,319 | B1 | 10/2020 | Prakash et al. |
| 2002/0198848 | A1 | 12/2002 | Michener |
| 2003/0023864 | A1 | 1/2003 | Muttik et al. |
| 2004/0019565 | A1 | 1/2004 | Goringe et al. |
| 2004/0255163 | A1 | 12/2004 | Swimmer et al. |
| 2005/0013293 | A1 | 1/2005 | Sahita |
| 2006/0179296 | A1 | 8/2006 | Bartlett et al. |
| 2007/0118483 | A1 | 5/2007 | Hill et al. |
| 2008/0167003 | A1 | 7/2008 | Wang et al. |
| 2009/0048953 | A1 | 2/2009 | Hazel et al. |
| 2011/0126059 | A1 | 5/2011 | Klein |
| 2013/0031042 | A1 | 1/2013 | Dehnie et al. |
| 2014/0046998 | A1 | 2/2014 | Dain et al. |
| 2014/0229729 | A1* | 8/2014 | Roth ....................... H04L 63/08 713/153 |
| 2014/0359280 | A1 | 12/2014 | Saboor et al. |
| 2015/0026786 | A1 | 1/2015 | Alexander |
| 2015/0135279 | A1 | 5/2015 | Hayat |
| 2015/0178724 | A1 | 6/2015 | Ngo et al. |
| 2016/0148202 | A1 | 5/2016 | McCormack et al. |
| 2016/0149873 | A1 | 5/2016 | Dickinson et al. |
| 2016/0149923 | A1 | 5/2016 | Zhang et al. |
| 2016/0378629 | A1 | 12/2016 | Gwozdz |
| 2017/0026371 | A1 | 1/2017 | Holtmanns et al. |
| 2017/0083860 | A1* | 3/2017 | Sriram ................ G06Q 10/0833 |
| 2017/0331802 | A1 | 11/2017 | Keshava et al. |
| 2018/0041336 | A1* | 2/2018 | Keshava ................ H04L 9/0891 |
| 2018/0075262 | A1 | 3/2018 | Auh |
| 2018/0109508 | A1 | 4/2018 | Wall et al. |
| 2019/0098039 | A1 | 3/2019 | Gates et al. |
| 2019/0108511 | A1 | 4/2019 | Dunjic et al. |
| 2019/0158594 | A1 | 5/2019 | Shadmon et al. |
| 2019/0236592 | A1 | 8/2019 | Arora |
| 2019/0253434 | A1 | 8/2019 | Biyani et al. |
| 2021/0133067 | A1* | 5/2021 | Radu .................... G07F 17/3223 |
| 2023/0318816 | A1* | 10/2023 | Nakazawa ............ H04L 9/3236 713/171 |

FOREIGN PATENT DOCUMENTS

| | | |
|---|---|---|
| CN | 106462601 A | 2/2017 |
| CN | 106464500 A | 2/2017 |
| CN | 108446947 A | 8/2018 |
| CN | 109413062 A | 3/2019 |
| EP | 2965465 A1 | 1/2016 |
| EP | 2780832 B1 | 5/2016 |
| EP | 2965465 B1 | 5/2018 |
| EP | 3358867 A1 | 8/2018 |
| EP | 3364363 A1 | 8/2018 |
| EP | 3416118 A1 | 12/2018 |
| EP | 3432248 A1 | 1/2019 |
| RU | 97119182 A | 9/1999 |
| RU | 2686818 C1 | 4/2019 |
| WO | 2008082587 A1 | 7/2008 |
| WO | 2013155912 A1 | 10/2013 |
| WO | 2014135195 A1 | 9/2014 |
| WO | 2018031856 A1 | 2/2018 |
| WO | 2018050229 A1 | 3/2018 |

OTHER PUBLICATIONS

Extended European Search Report for European Patent Application No. 19178579.9, dated Oct. 23, 2019, 12 pages.
Extended European Search Report for European Patent Application No. 19178583.1, dated Dec. 12, 2019, 7 pages.
Rajeev Kumar Singh: "Generating unique IDs in a distributed environment at high scale. I CalliCoder", Jun. 8, 2018 (Jun. 8, 2018), XP055564378, 12 pp., Retrieved from the Internet: URL:hllps:// www.callicoder.com/distri buted-uniqued-sequence-number-generator/ [retrieved on Mar. 4, 2019].

* cited by examiner

CREDENTIAL MANAGEMENT IN DISTRIBUTED COMPUTING SYSTEM

CROSS-REFERENCE TO RELATED APPLICATIONS

This application is a National Phase application that is based on and claims benefit of priority from International Patent Application No. PCT/US2020/029187 filed on Apr. 22, 2020, which is based on and claims priority to European Patent Application Serial Nos. 19178579.9 filed on Jun. 5, 2019 and 19178583.1 filed on Jun. 5, 2019, the contents of which are hereby incorporated in their entireties for all purposes.

FIELD OF DISCLOSURE

The present disclosure relates to management of credentials and to a security model for use in a distributed computing system. The disclosure is particularly relevant to a distributed system that has a very large number of clients that require credentials associated with use of the system.

BACKGROUND TO DISCLOSURE

There are multiple technical challenges with requiring a centralized system to provide services to a very large number of clients, particularly when these are widely geographically distributed. It is logical to consider distributing the system so that the relevant services can be provided by a set of geographically distributed servers, rather than one central server or data centre.

In practice, such decentralisation may use a cloud architecture, which will typically use a number of geographically distributed servers—or data centres—to deliver services to clients. The cloud architecture may be considered as comprising a number of nodes—when using a cloud architecture, a node may be an aggregation of a number of computers, and may cover more than one data centre with "real-time" connectivity and data sharing within a given node.

Decentralisation may itself be problematic, particularly if it is necessary for services to be provided in such a way that provision of the service has consequences beyond the server providing the service and the client receiving it. If, for example, other clients (or other system nodes) need to refer back to the service providing node to check on whether, or how, the service has been provided, or if it is necessary for a central system to have knowledge of how the service has been provided or of performance of the distributed server node, then new bottlenecks may appear in place of the former bottleneck at the central server, the overall quantity of messaging in the system may increase, and network latency can become a serious issue.

This is particular serious when the service relates to security (so it is necessary to be confident that it has been securely performed across the whole system) and when it relates to provision of a service over a short time frame. Both issues apply to transaction systems—it is necessary for transactions to be authorised over short time periods, and it is necessary to ensure that they have been performed legitimately—but apply to other technical contexts as well.

SUMMARY OF DISCLOSURE

In a first aspect, the disclosure provides a computing node in a distributed information security system, wherein the computing node is adapted to communicate with a subset of clients of the distributed information security system, wherein the computing node provides at least one cryptographic service for the clients of the subset, wherein the computing node is provisioned with a plurality of keys for use by said at least one cryptographic service, wherein the computing node is adapted to associate a key from the plurality of keys to a service request for a client according to a deterministic process based on one or more data associated with the client.

This approach allows for a scalable solution to provision of cryptographic services in a distributed system. Keys are allocated to a service request in a reproducible way because of the use of a deterministic process, allowing cryptographic services to establish the correct key to use when provided with relevant input conditions. In embodiments, the deterministic process allows the same key to be associated with another service request when the deterministic process is based on the same one or more data associated with the client.

This service request may relate to provision or use of a credential associated with the client. The credential may be associated with a transaction performed by the client. The service request may comprise a request to generate the credential, or may comprise a request to validate the credential.

In embodiments described in detail below, the deterministic process selects the key from a key list. This key list may be sealed with a cryptographic key list seal. In embodiments, the key list has a limited period of validity, and the computing node is adapted to replace the key list with another key list when the key list is no longer valid. Another key list may then be provided by a central service remote from the computing node, or generated locally or provided by a peer node. In the case of credentials, this period of validity may relate to generation of a credential but not to validation of a generated credential. Where a key list is used, the cryptographic service may use not only the key but one or more other information items from the key list.

In embodiments, the computing node provides a service to the client in response to the service request. There may be an access control mechanism associated with this service, wherein to access the service, the client must satisfy the access control mechanism. The computing node may comprise a plurality of service processes adapted to respond to service requests. In the case of credentials, service processes may be credential generating service processes or credential validating service processes.

The computing node may comprise one or more hardware security modules. It may also comprise a monitoring service to monitor performance of the computing node. Such a monitoring service may report to a central service remote from the computing node.

The computing node may lie within a transaction processing system and the service requests relate to the processing of transactions. A transaction identifier may be comprised within the client data. A local transaction counter may be used to provide the transaction identifier.

In a second aspect, the disclosure provides a distributed information security system comprising a plurality of computing nodes as described above in relation to the first aspect, wherein the distributed information security system is adapted to route a request for provision of said at least one cryptographic service to one of the plurality of nodes.

In a third aspect, the disclosure provides a method of providing a cryptographic service at a computing node of a distributed information security system for a subset of the clients of the distributed information security system, comprising the computing node: establishing communication with a subset of clients of the distributed information security system; establishing a plurality of keys for use by said at least one cryptographic service; and associating a key from the plurality of keys to a service request for a client according to a deterministic process based on one or more data associated with the client.

The deterministic process may allow the same key to be associated with another service request when the deterministic process is based on the same one or more data associated with the client. The service request may relate to provision or use of a credential associated with the client. Such a credential may be associated with a transaction performed by the client. This service request may comprise a request to generate the credential or a request to validate the credential.

The deterministic process may select the key from a key list. This key list may be sealed with a cryptographic key list seal. Such a key list may have a limited period of validity, and the computing node be adapted to replace the key list with another key list when the key list is no longer valid. Another key list may then be provided by a central service remote from the computing node, generated locally or provided by a peer node. In the case of credentials, the period of validity may relate to generation of a credential but not to validation of a generated credential. The cryptographic service may use not only the key but one or more other information items from the key list.

In embodiments, a service may be provided to the client in response to the service request. There may be an access control mechanism associated with this service, wherein to access the service, the client must satisfy the access control mechanism. The computing node may comprise a plurality of service processes adapted to respond to service requests. In the case of credentials, these may be credential generating service processes or credential service validating processes.

In embodiments, performance of the computing node may be monitored with a monitoring service. This monitoring service may report to a central service remote from the computing node.

The computing node may lie within a transaction processing system and the service requests relate to the processing of transactions. A transaction identifier may be comprised within the client data. A local transaction counter may be used to provide the transaction identifier.

DESCRIPTION OF SPECIFIC EMBODIMENTS

Specific embodiments of the disclosure are now described, by way of example, with reference to the accompanying drawings, of which:

Figure 7:
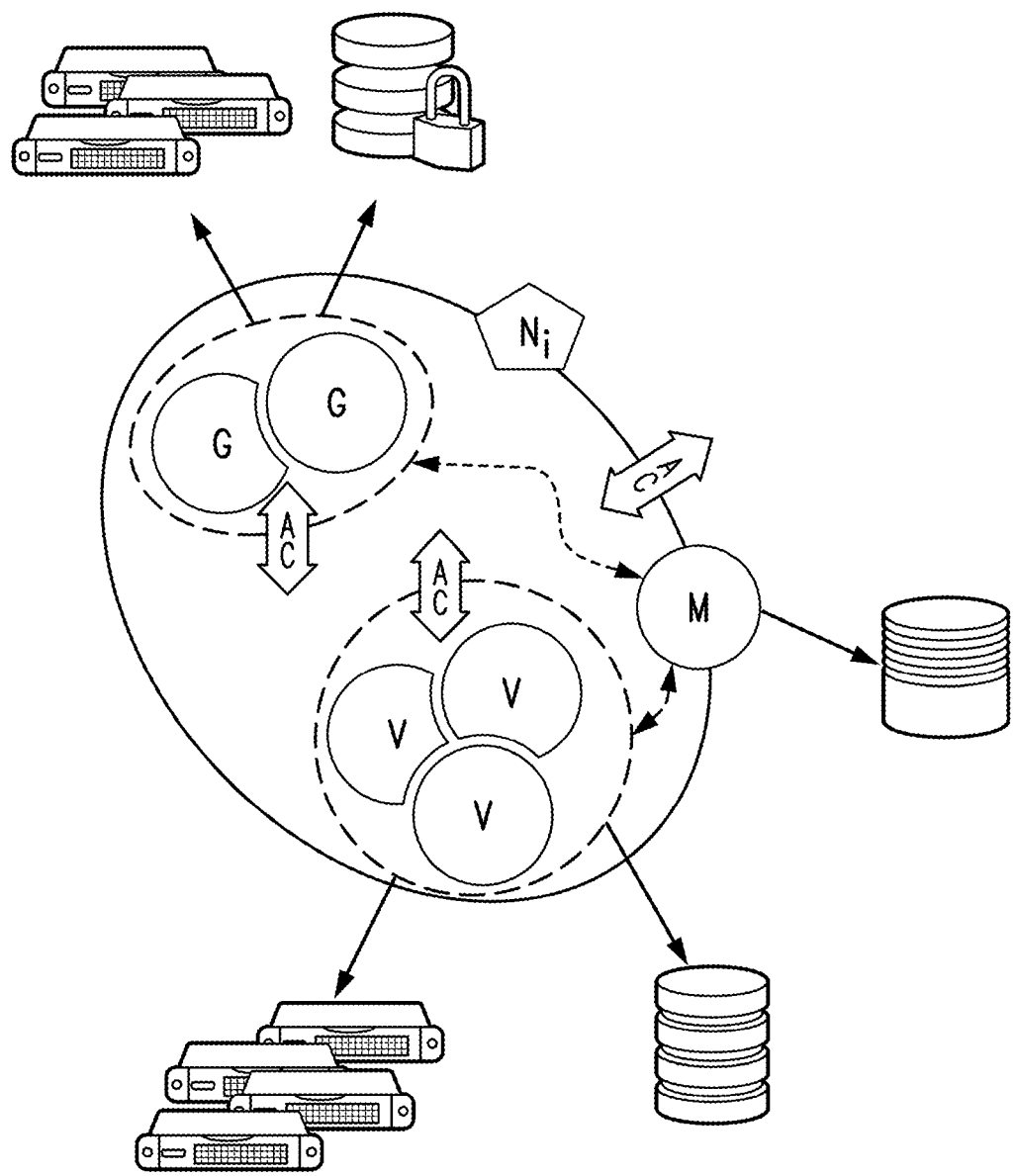
FIG. 7 illustrates a computing node of the arrangement of FIG. 6 in more detail.
Figure 8:
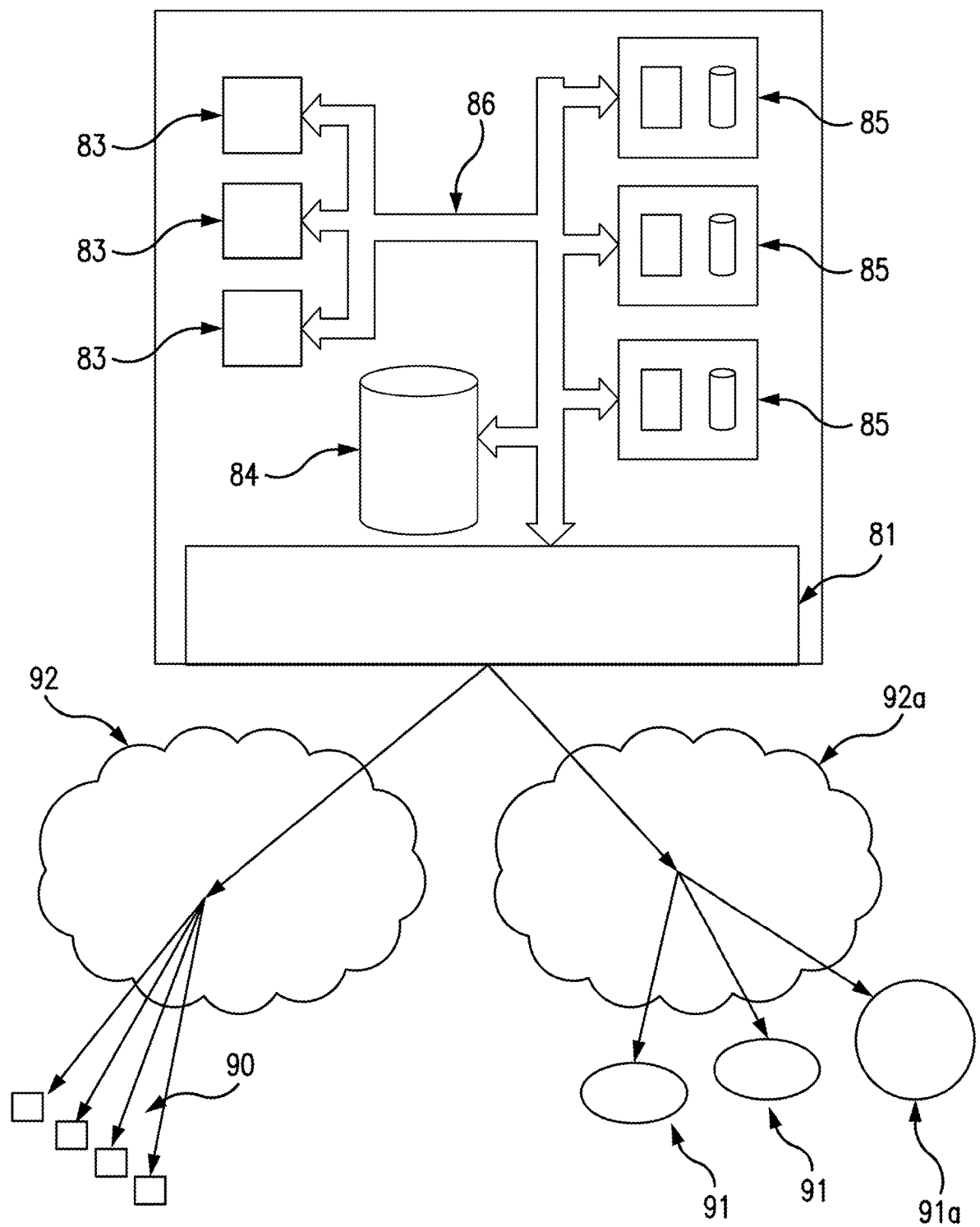
FIG. 8 illustrates elements within the computing node of FIG. 7.
Figure 9:
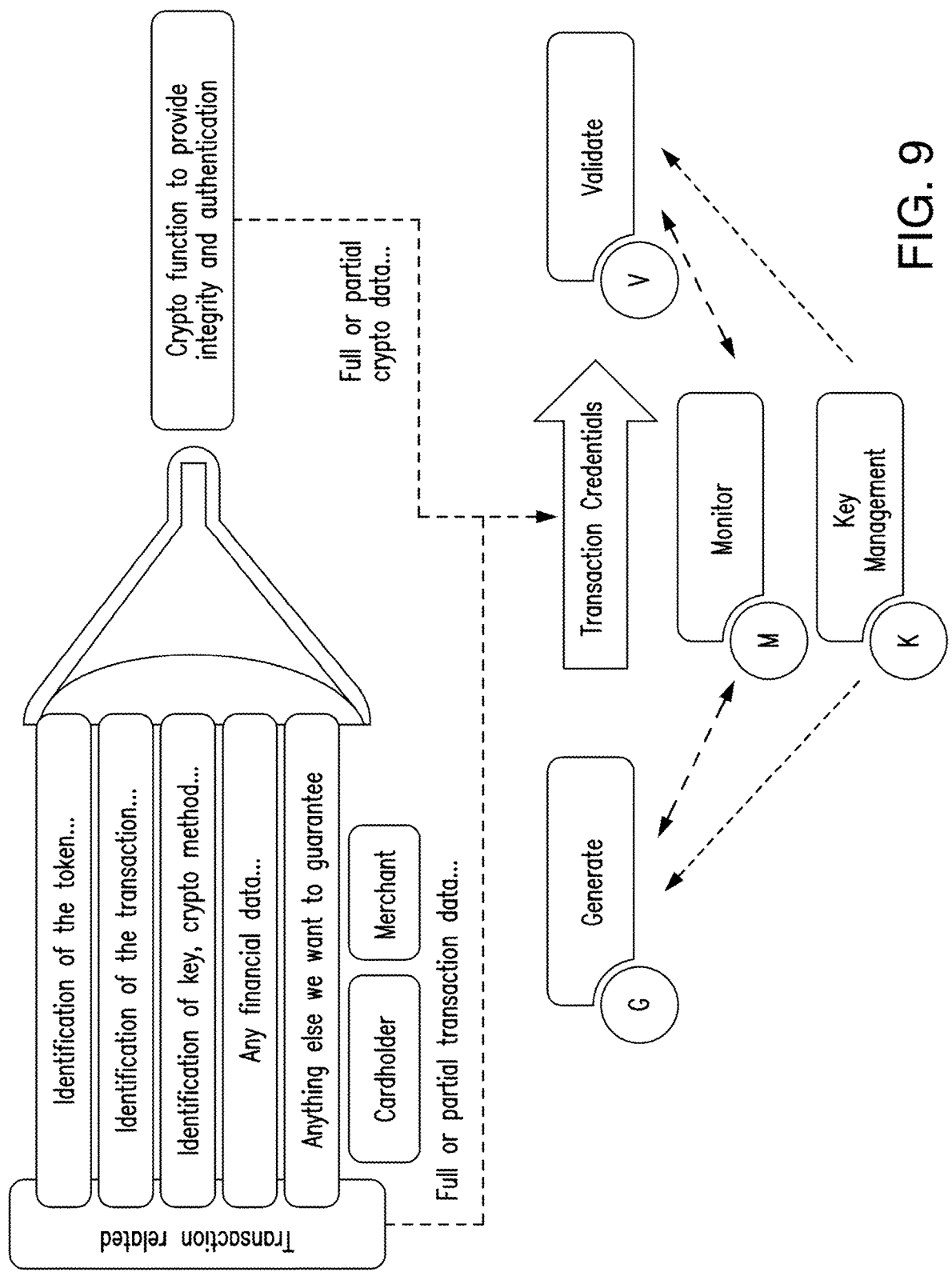
Figure 10:
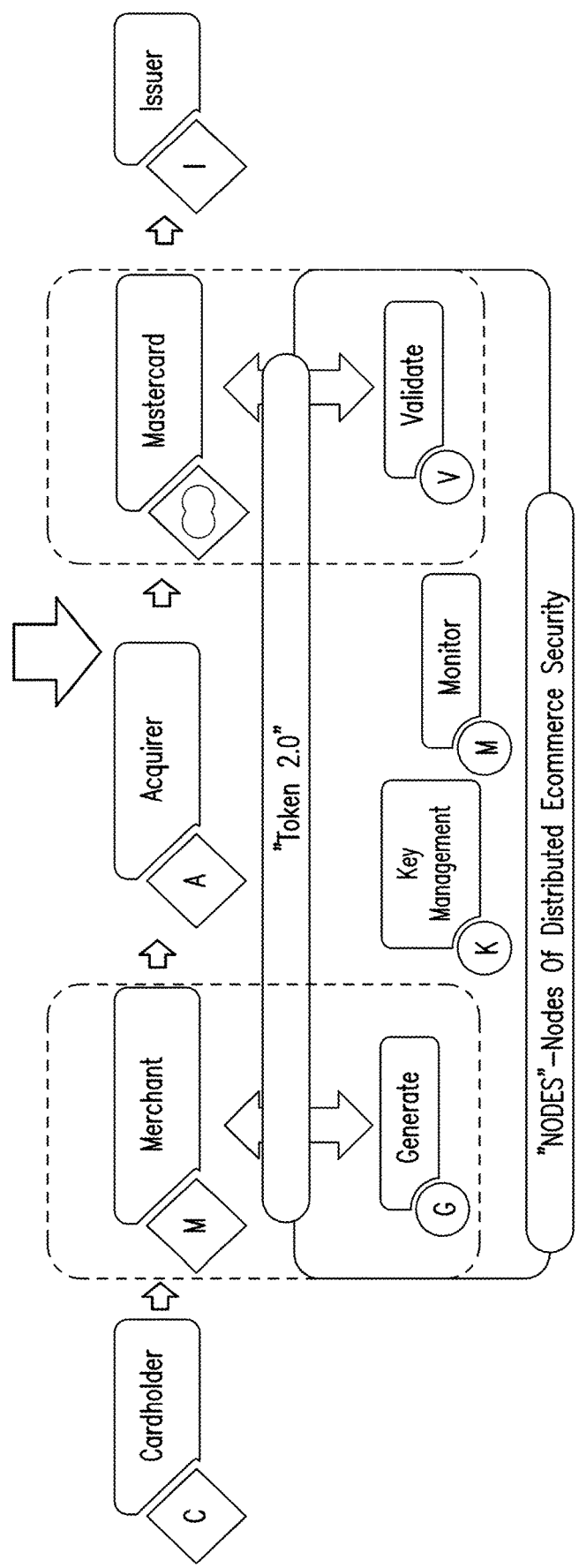
Figure 11:
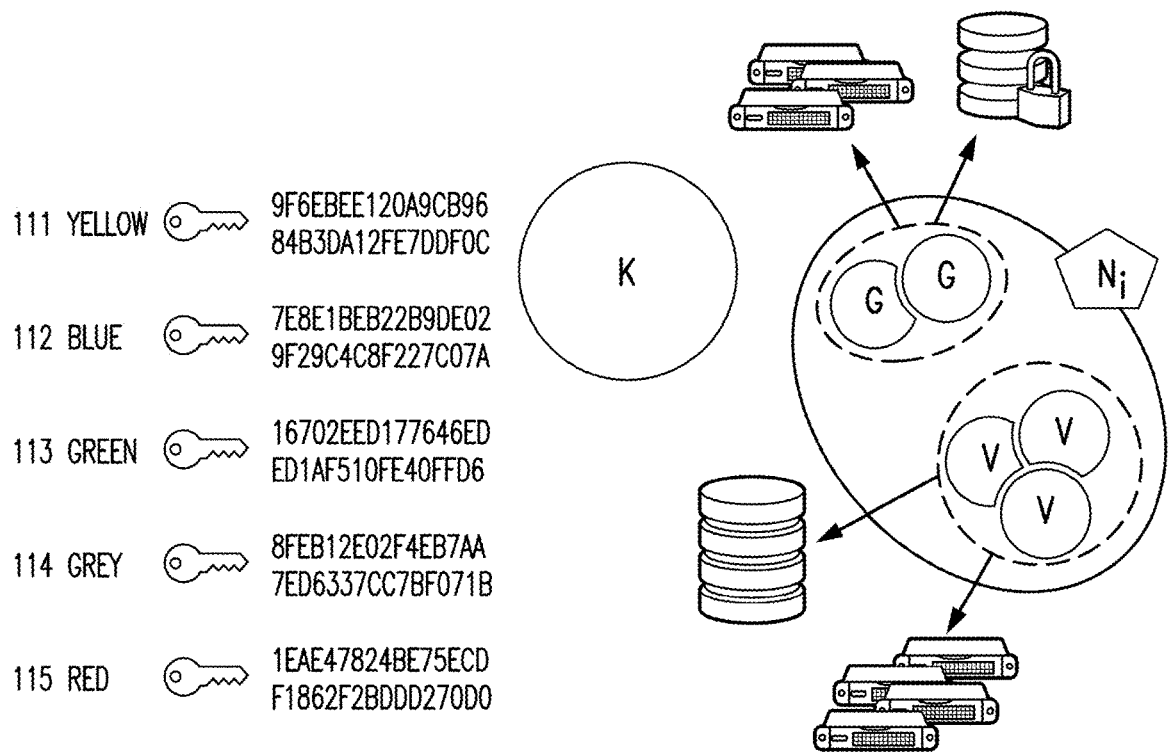
Figure 11:
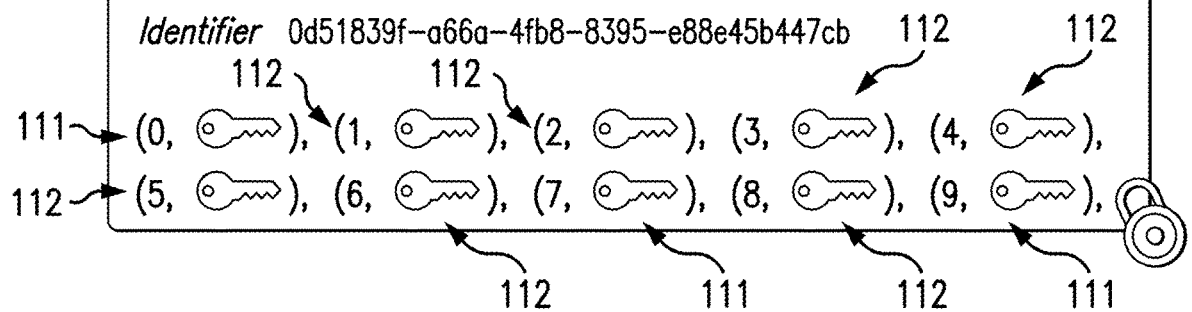
Figure 11:
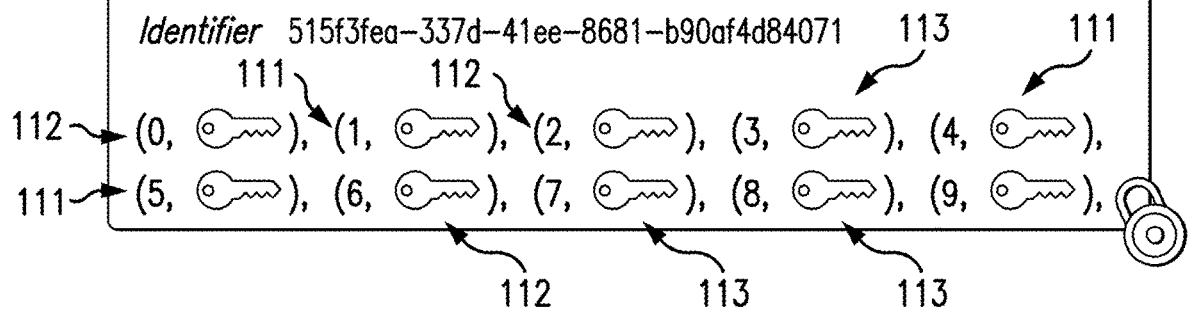
Figure 12:
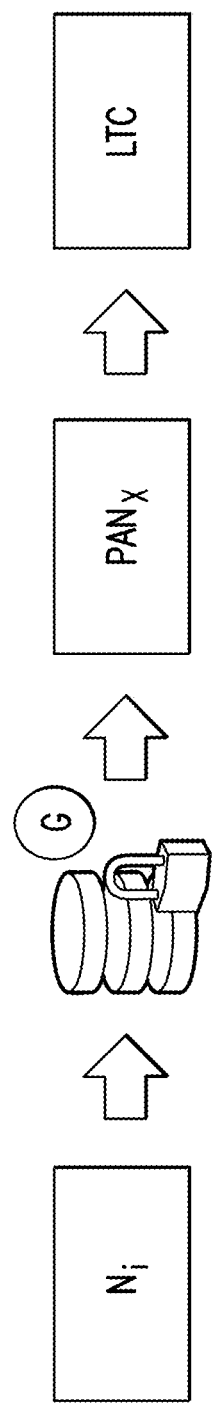
Figure 13:
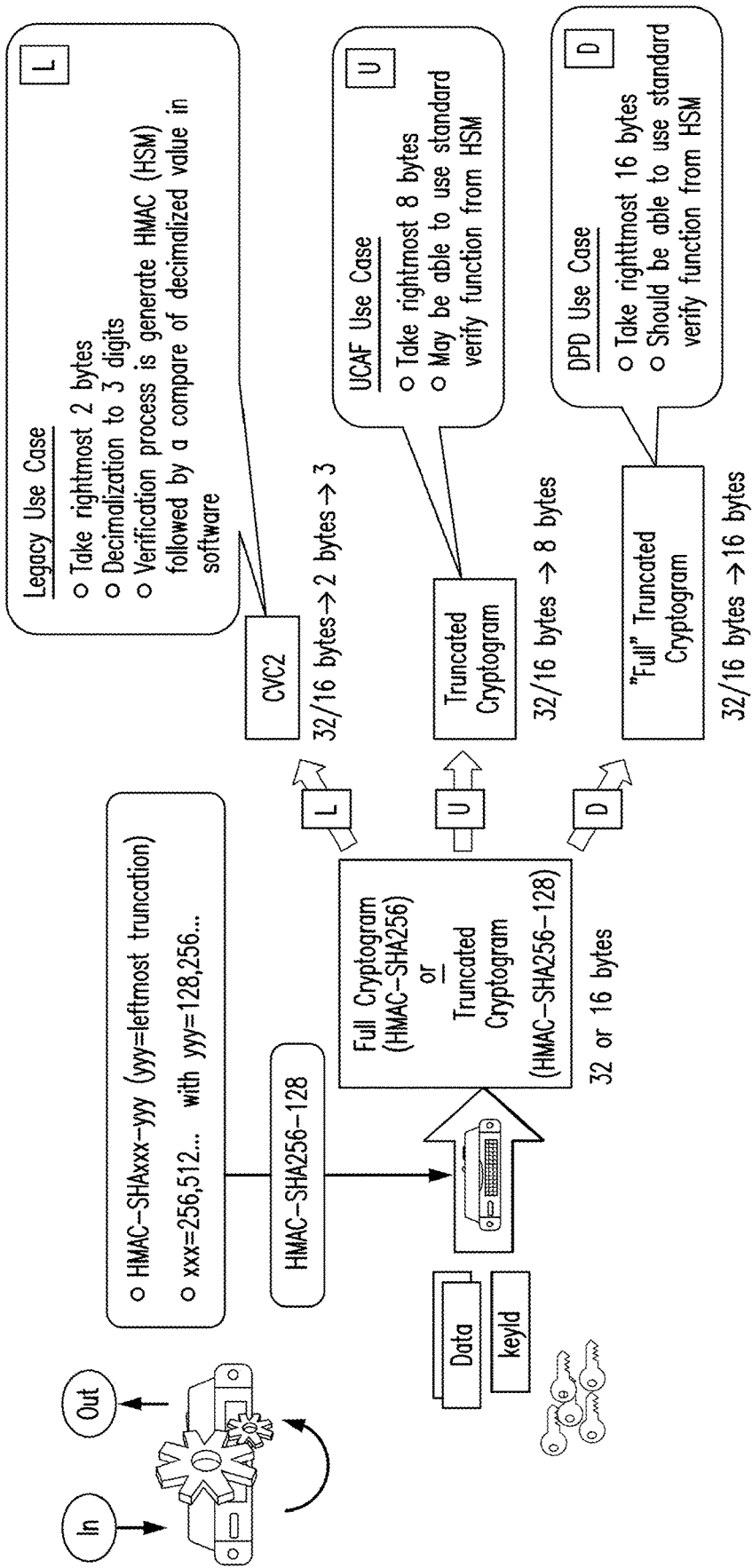
Figure 14:
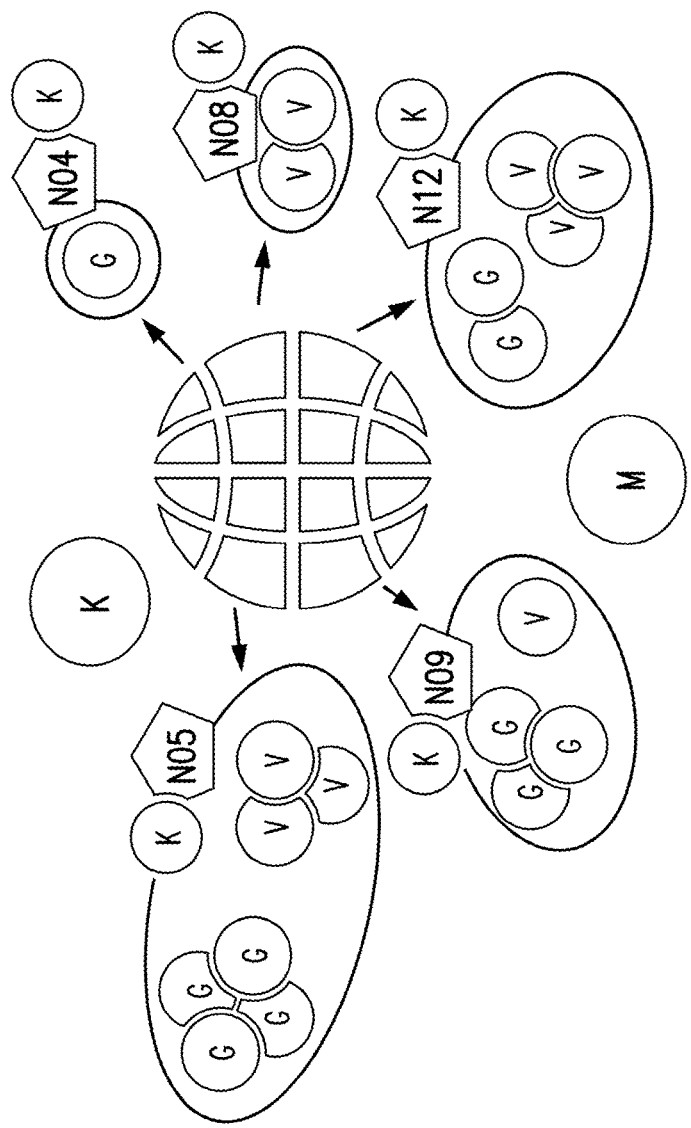
Figure 14:
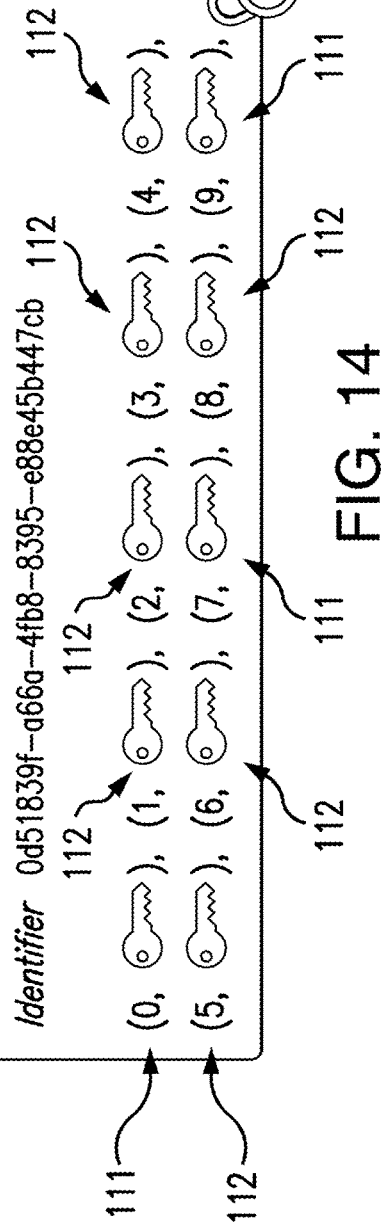
Figure 15:
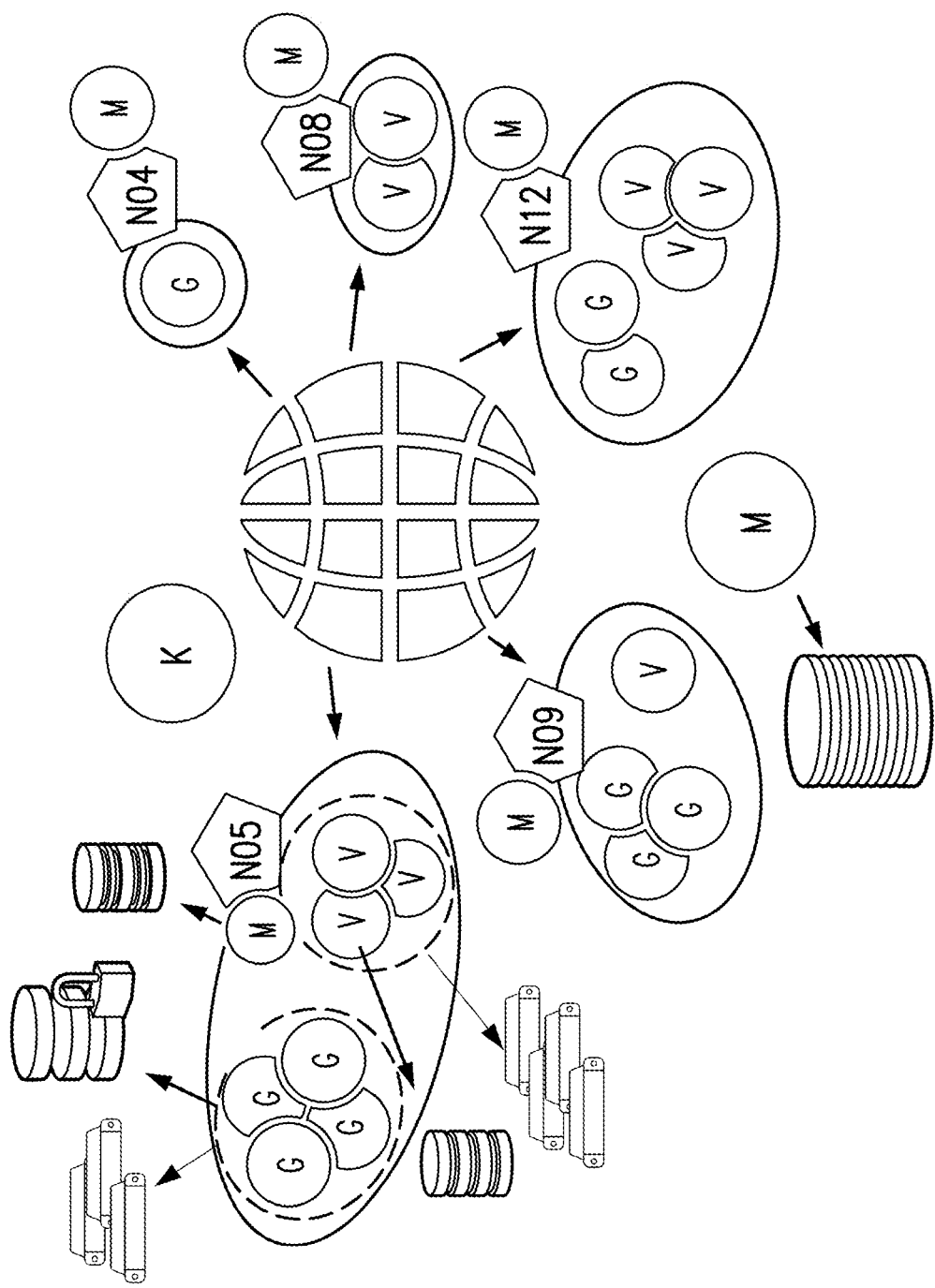
Figure 16:
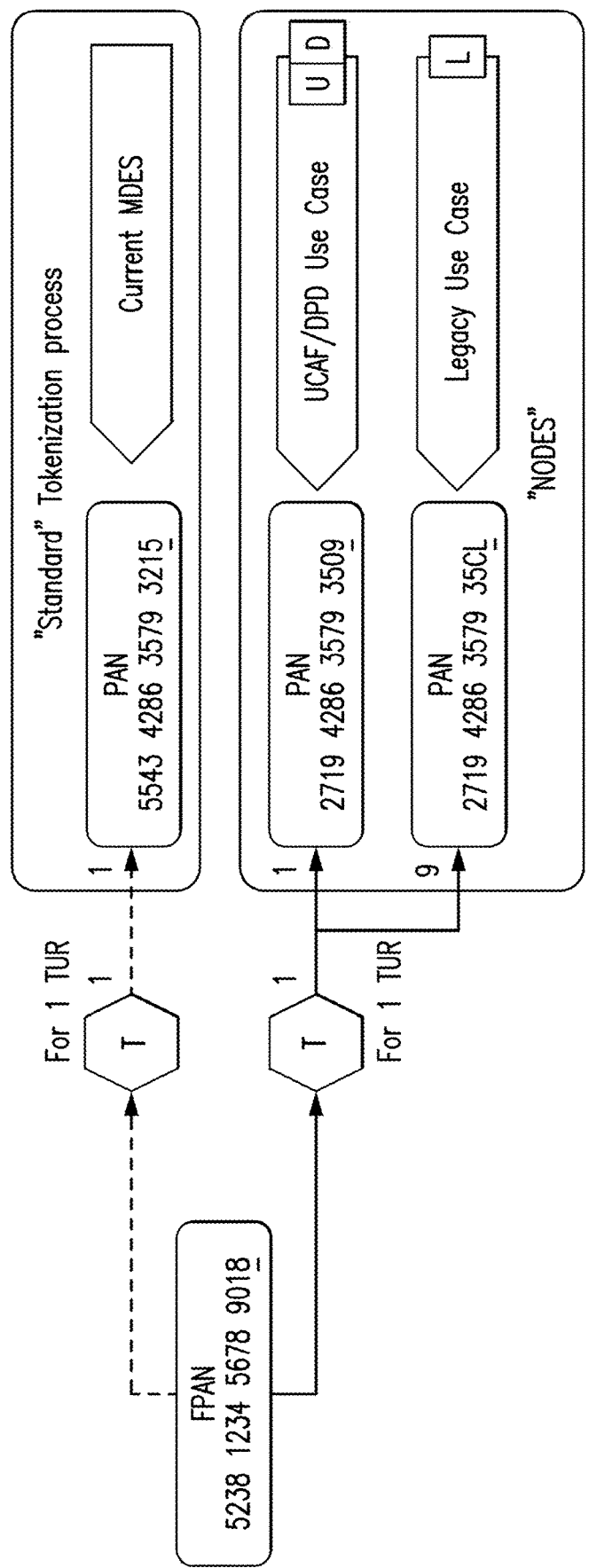
Figure 17:
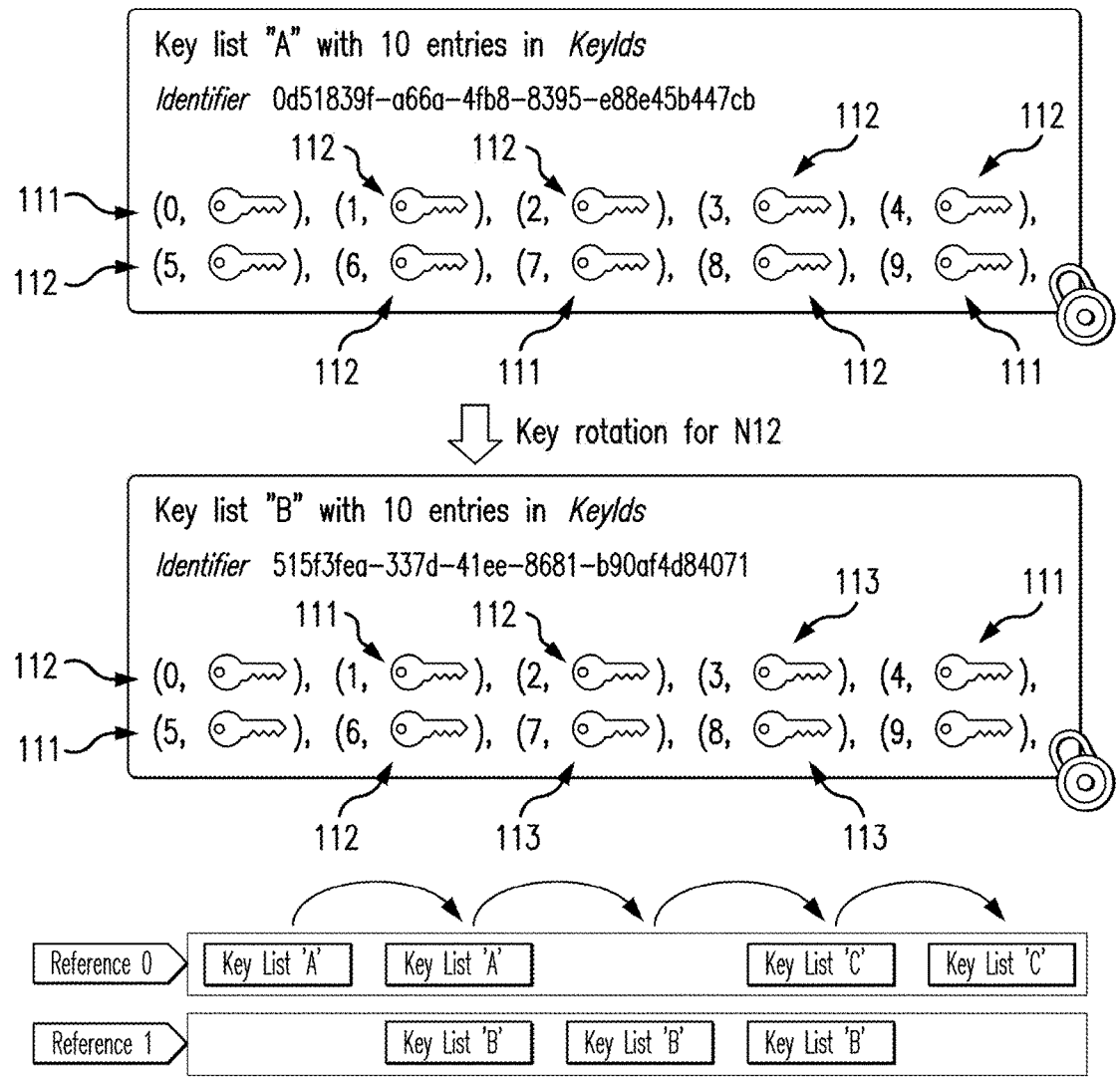
Figure 17:
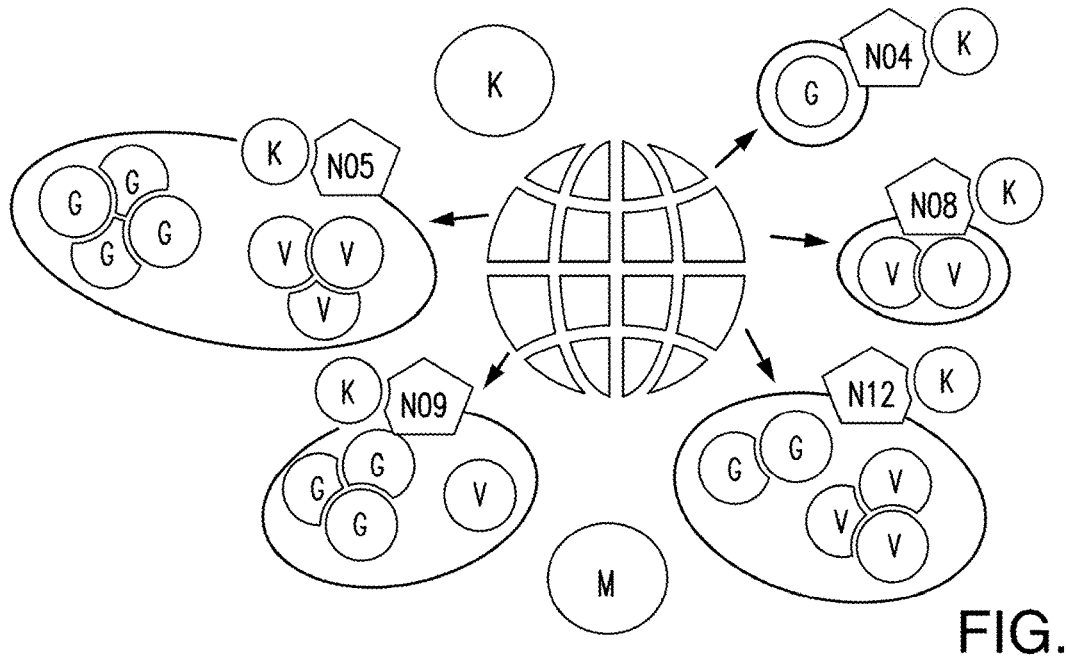
Figure 18:
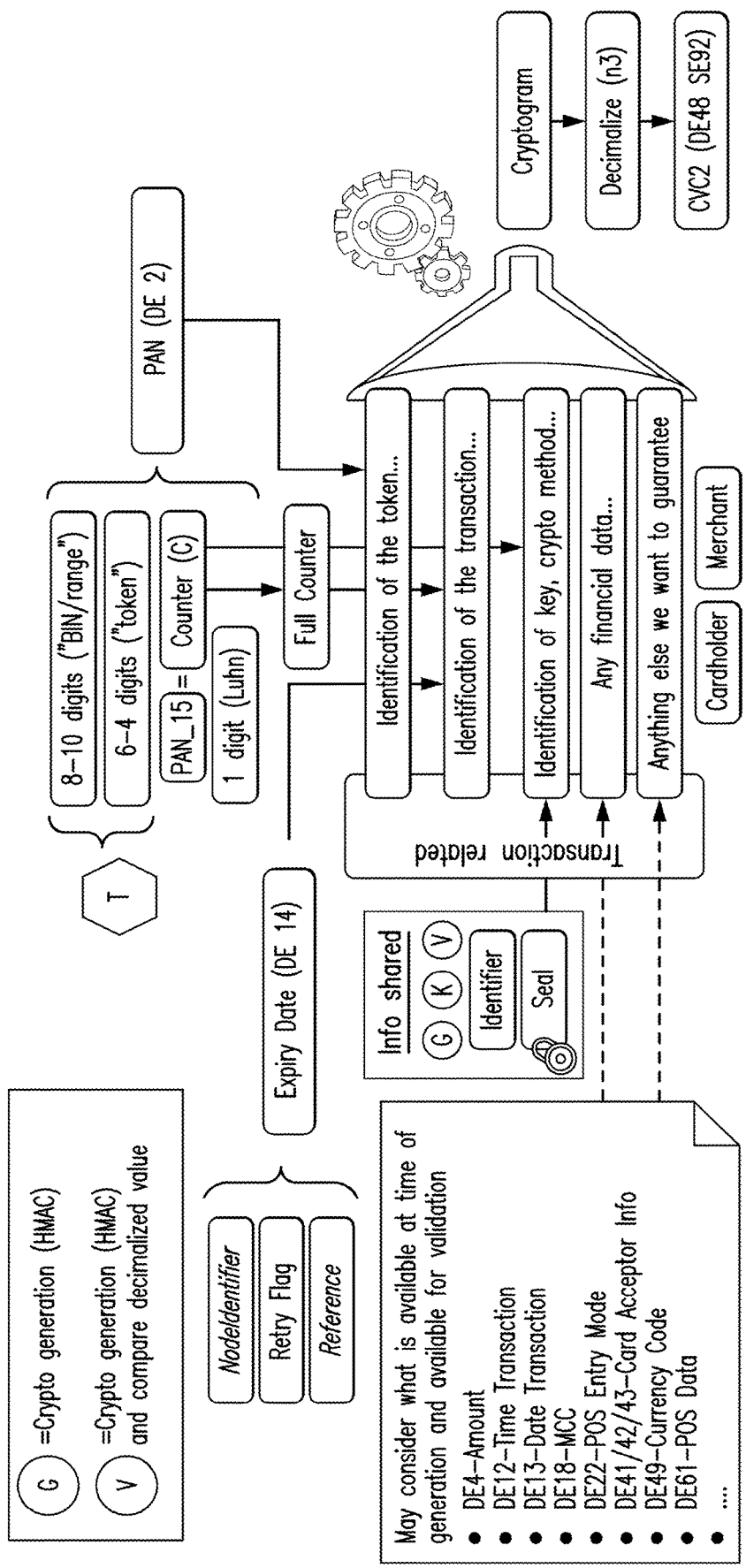
Figure 19:
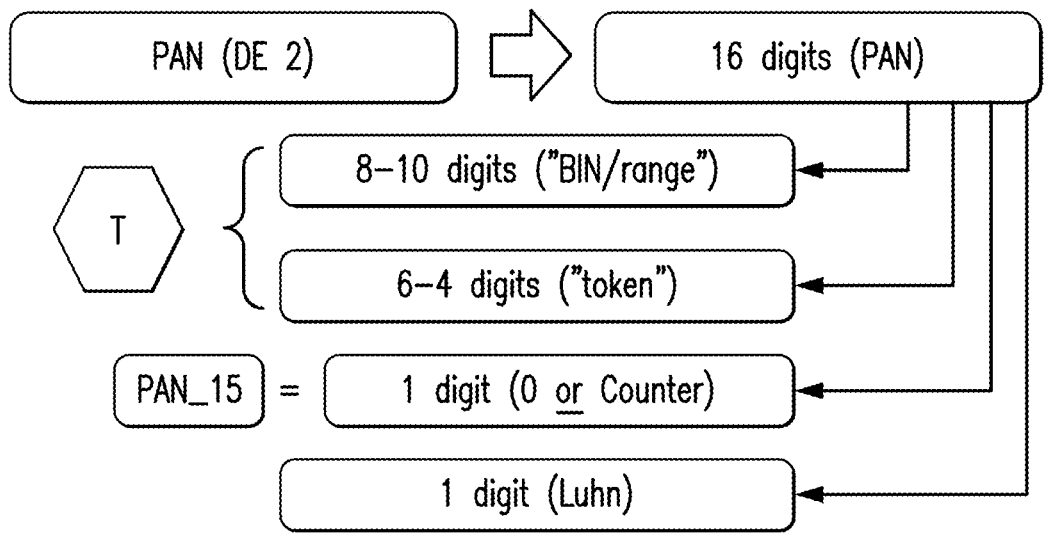
Figure 19:
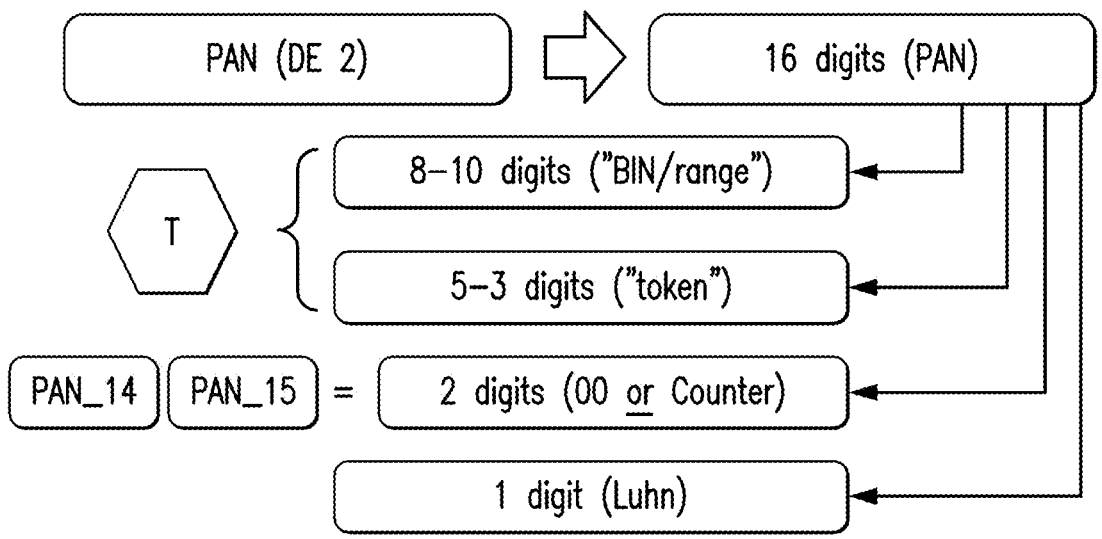
Figure 20:
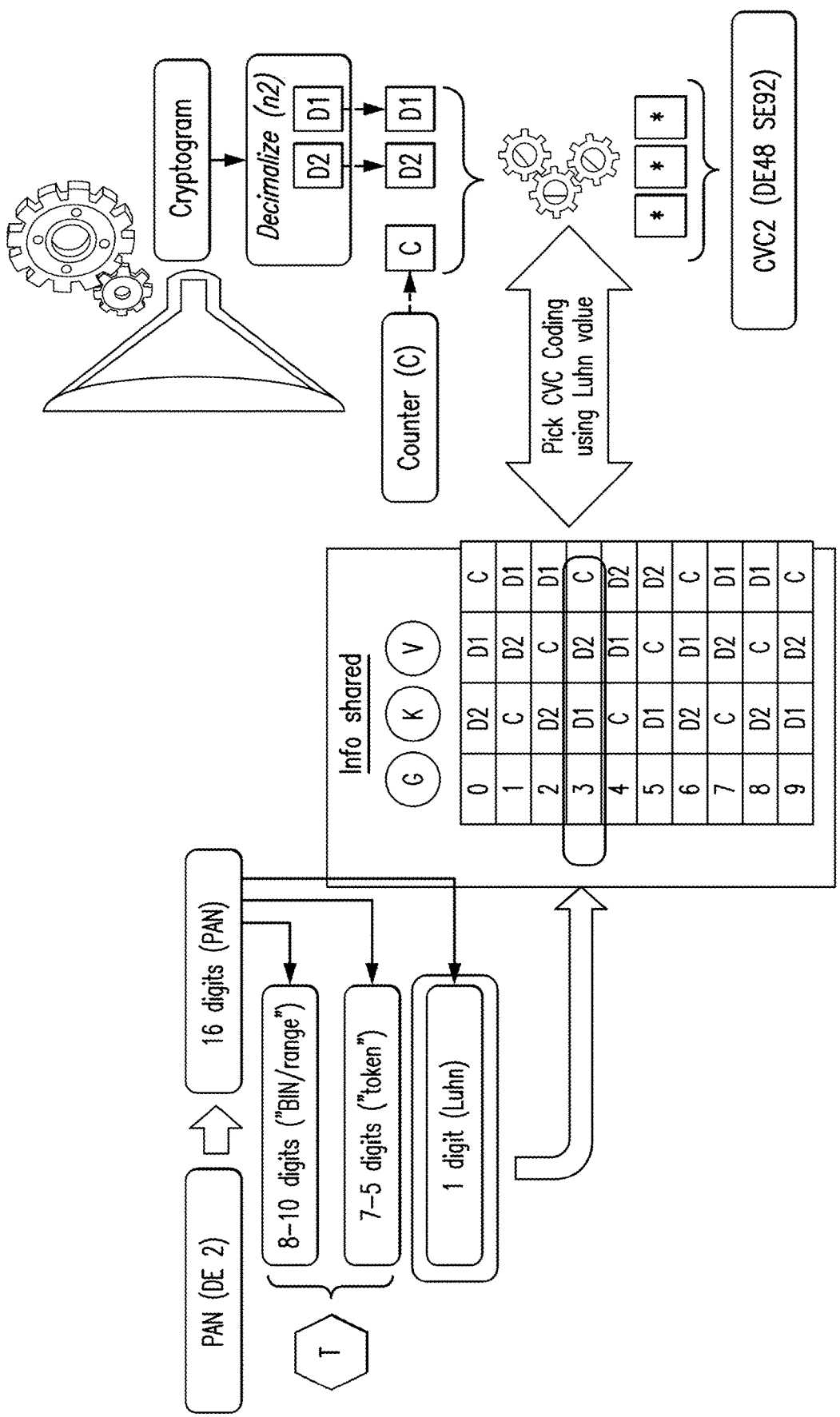
Figure 21:
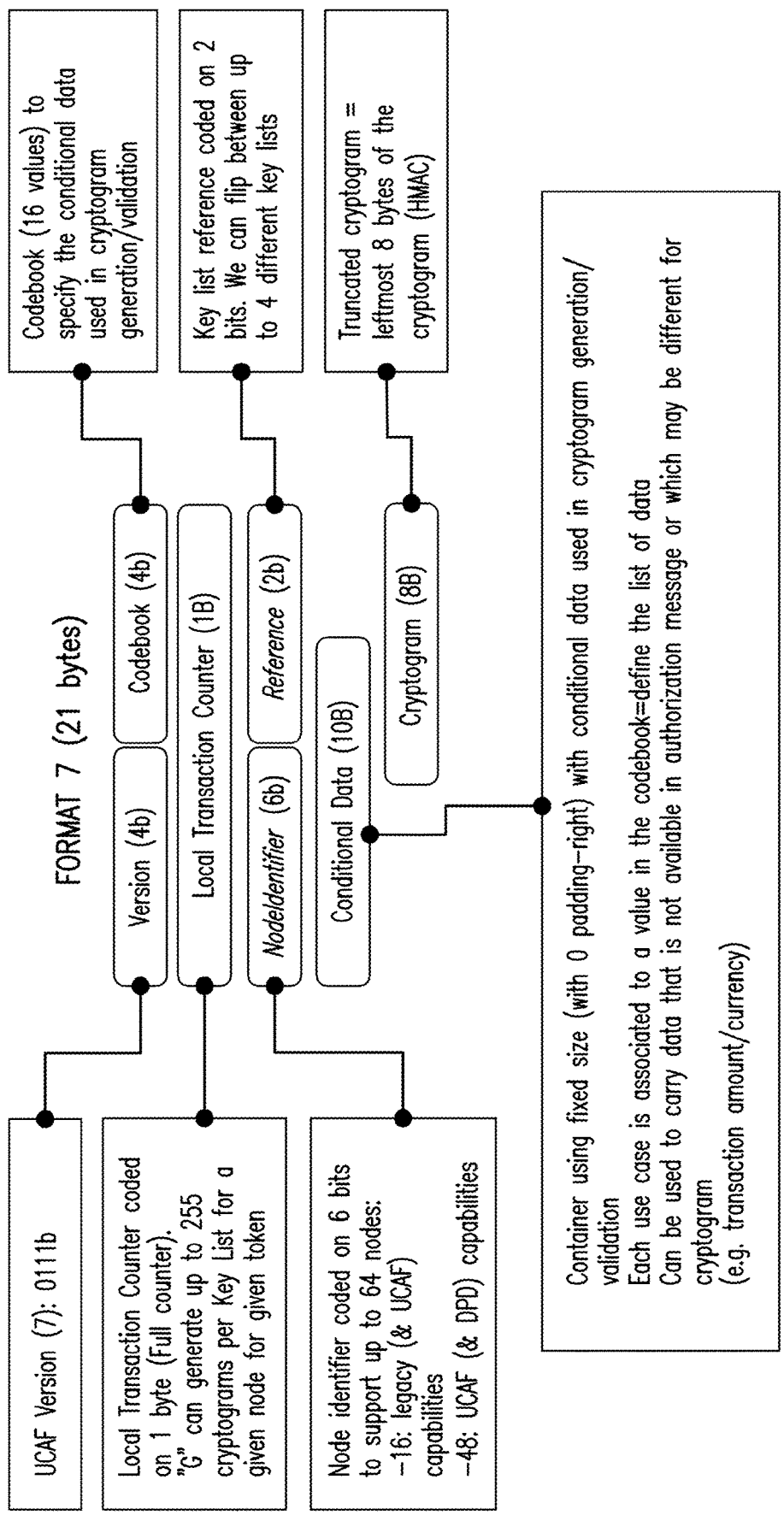
Figure 22:
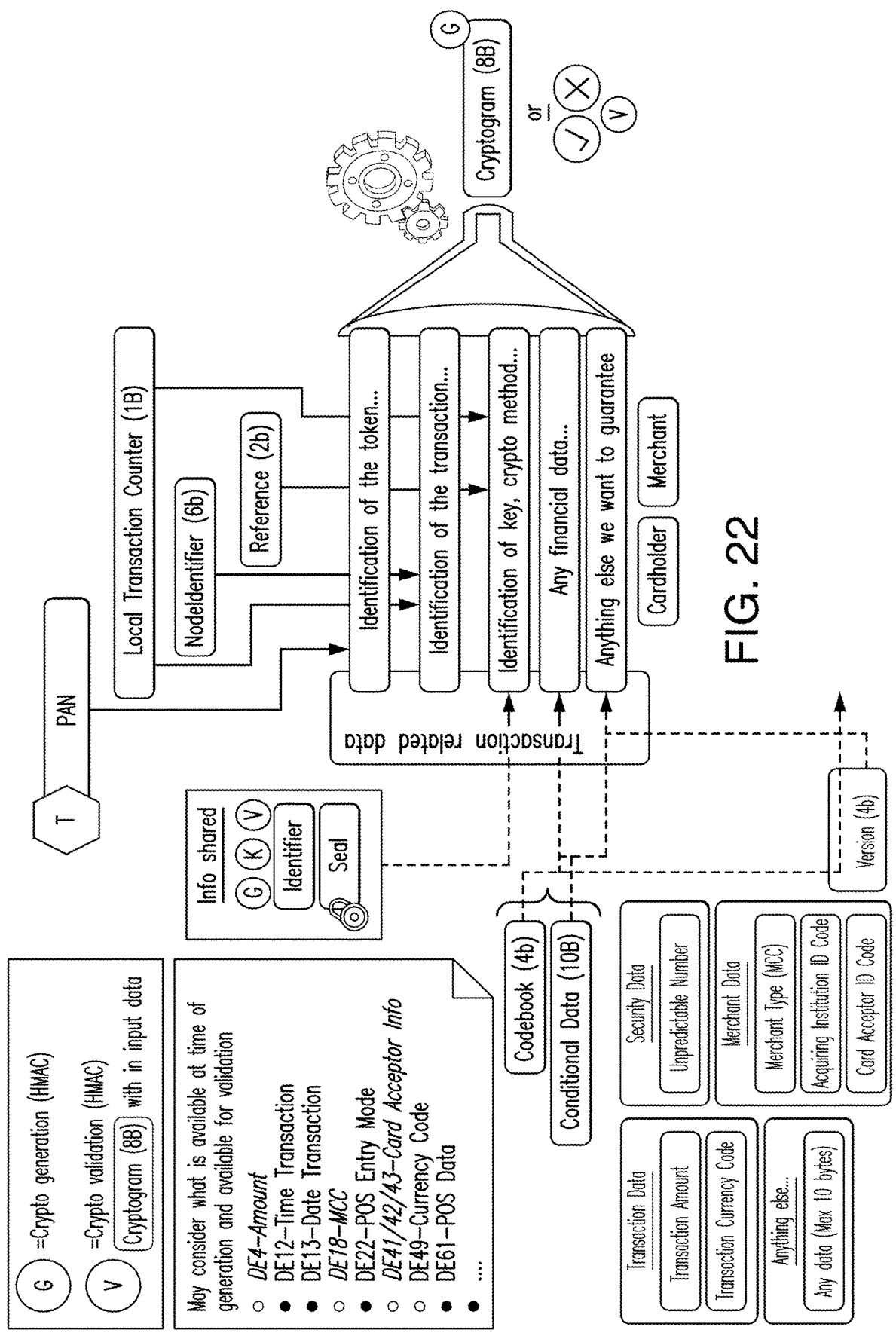
Figure 23:
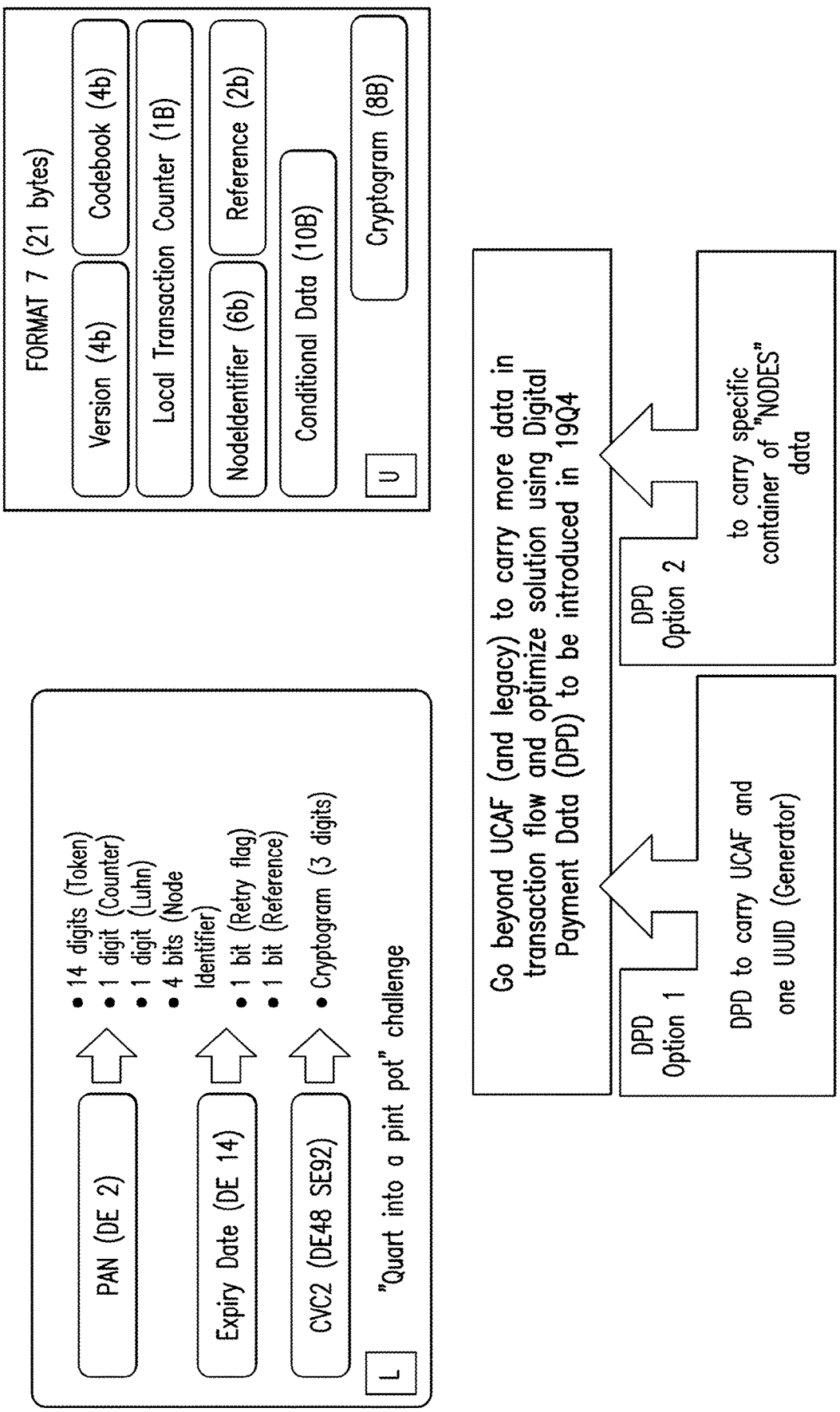

FIG. 9 indicates transaction flow in relation to operations performed by the node of FIG. 7;

FIG. 10 indicates use of tokenisation in an embodiment of the arrangement of FIGS. 7 to 9;

FIG. 11 indicates an approach to key management used in embodiments of the disclosure;

FIG. 12 illustrates an exemplary approach to transaction identification;

FIG. 13 illustrates an exemplary set of cryptographic mechanisms for use for digitised transactions in embodiments of the disclosure;

FIG. 14 illustrates a global model of key management with individual modes managed as shown in FIG. 11;

FIG. 15 illustrates a global model of monitoring associated with the key management model of FIGS. 11 and 14;

FIG. 16 illustrates an exemplary modified tokenisation process for transactions using a legacy use case with the nodes of FIGS. 7 and 8;

FIG. 17 illustrates a key rotation process for a system using a legacy use case;

FIG. 18 illustrates an exemplary set of cryptographic mechanisms for use for digitised transactions using a legacy use case;

FIG. 19 illustrates an approach to carry a local transaction counter using a legacy use case suitable for use with the nodes of FIGS. 7 and 8;

FIG. 20 illustrates using the approach of FIG. 19 in delivery of a local transaction counter using the Card Verification Code (CVC) for use with the nodes of FIGS. 7 and 8;

FIG. 21 illustrates an approach to carry transaction credentials information as part of a transaction using a UCAF (Universal Cardholder Authentication Field) format suitable for use with the nodes of FIGS. 7 and 8;

FIG. 22 illustrates an exemplary set of cryptographic mechanisms for use for digitised transactions using a UCAF format; and FIG. 23 illustrates an approach to carry transaction credentials information using DPD (Digital Payment Data) for use with the nodes of FIGS. 7 and 8.

Figure 1:
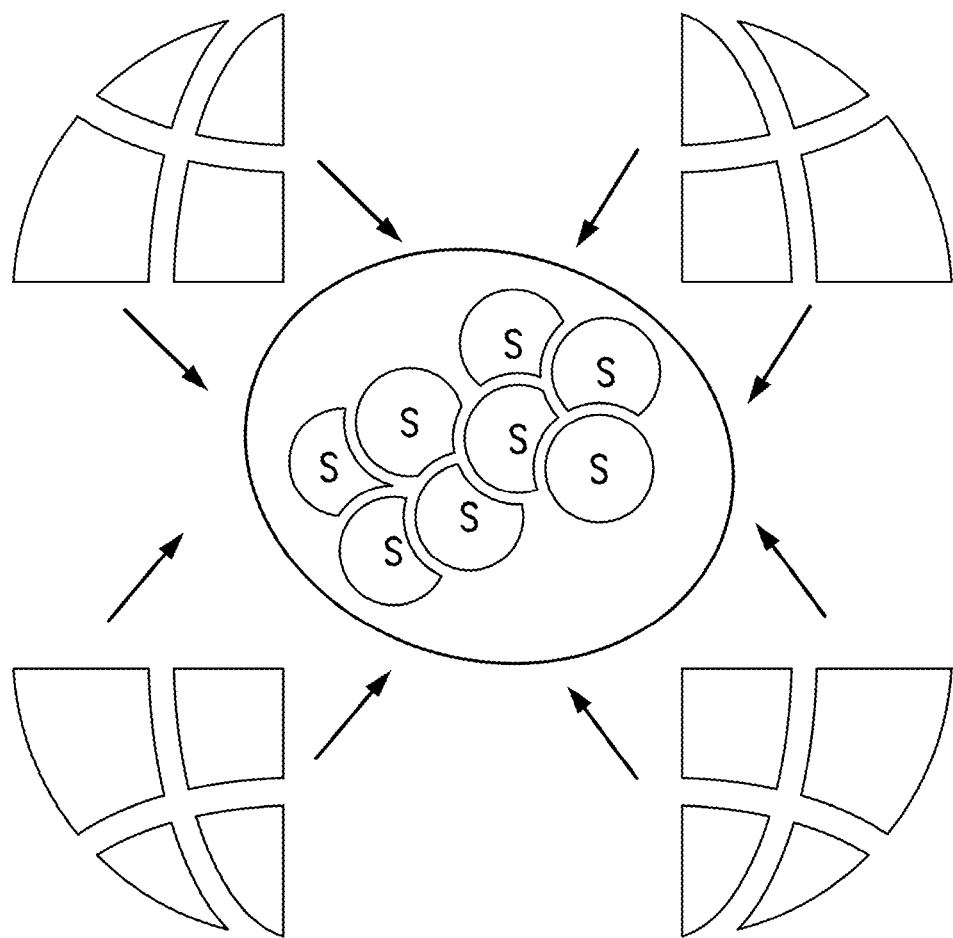
FIG. 1 shows multiple clients interacting with a central server.
Figure 2:
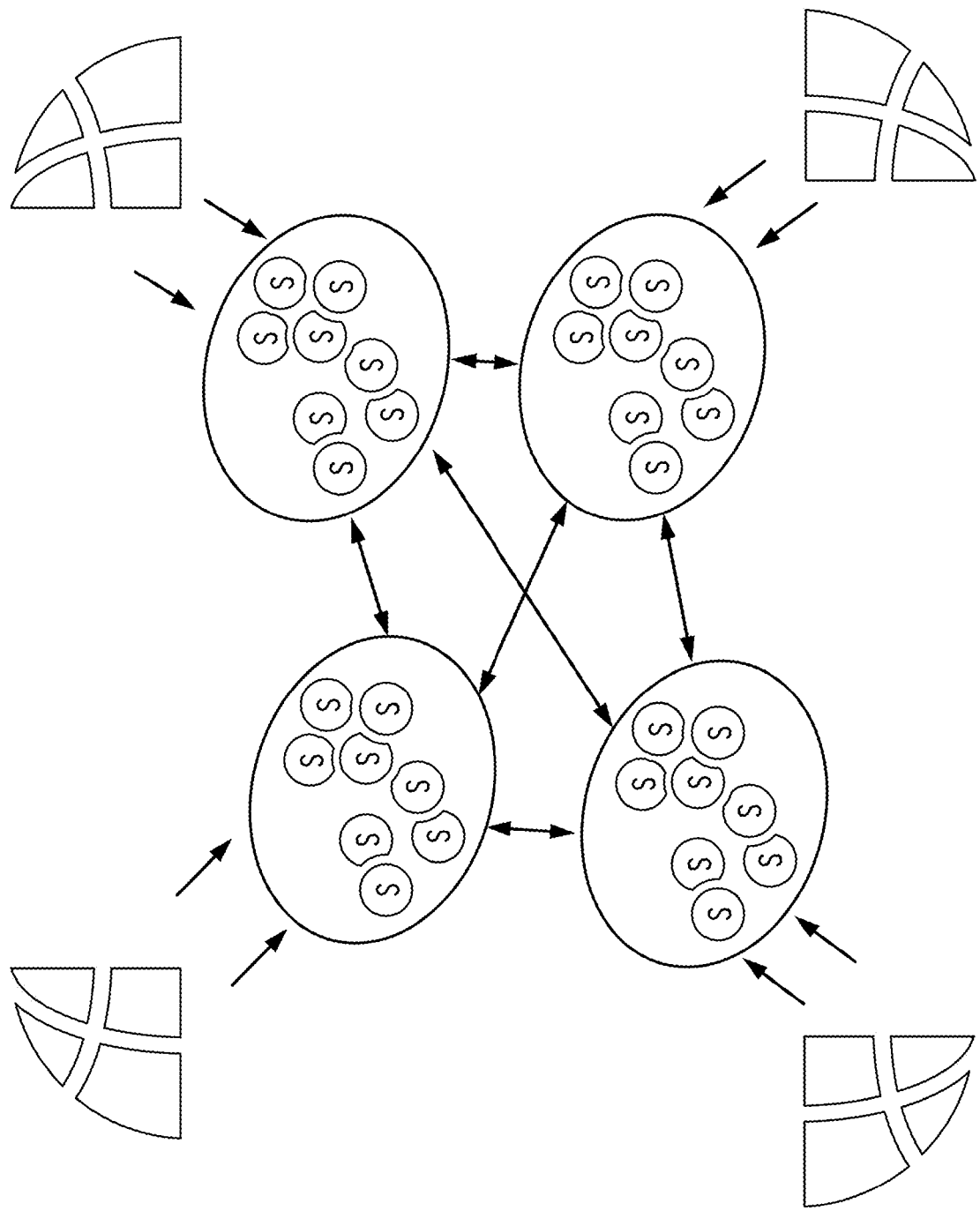
FIG. 2 shows multiple clients interacting with a distributed computing architecture providing the same services as the central server of FIG. 1.

In general terms, the problem addressed by the disclosure is illustrated in FIGS. 1 and 2. FIG. 1 shows a central system performing functions in response to requests from a very large number of geographically distributed entities. This places intense demand on the central system in relation to processing capability, storage and messaging, and will typically lead to significant latency in the system overall because of bottlenecks and messaging requirements.

FIG. 2 shows an alternative arrangement in which the role of the central system is disaggregated so that the same functions are performed by a distributed set of nodes, each with the capability to perform some or all of the functions provided by the central system. Individual nodes should see a significantly lower demand than the central system, and as entities should be able to interact with a more local node than the central system, there is potential to reduce latency. However, as discussed above in general terms, and below with specific relevance to a transaction processing system, there are significant technical challenges in achieving this benefit.

This issue is particularly relevant to transaction processing systems, and in particular to systems for handling digital transactions. The number of digital transactions is increasing extremely rapidly, and it is necessary for them to execute reliably and rapidly. Support of these transactions can use transaction processing systems developed for device based payments using payment cards and use the protocols of such payment systems, but in practice such transactions have a different character from device-based transactions. This is discussed below, first by reference to the general elements of a transaction processing system, and then by a more detailed discussion of the infrastructure used to support digital transactions.

Figure 3:
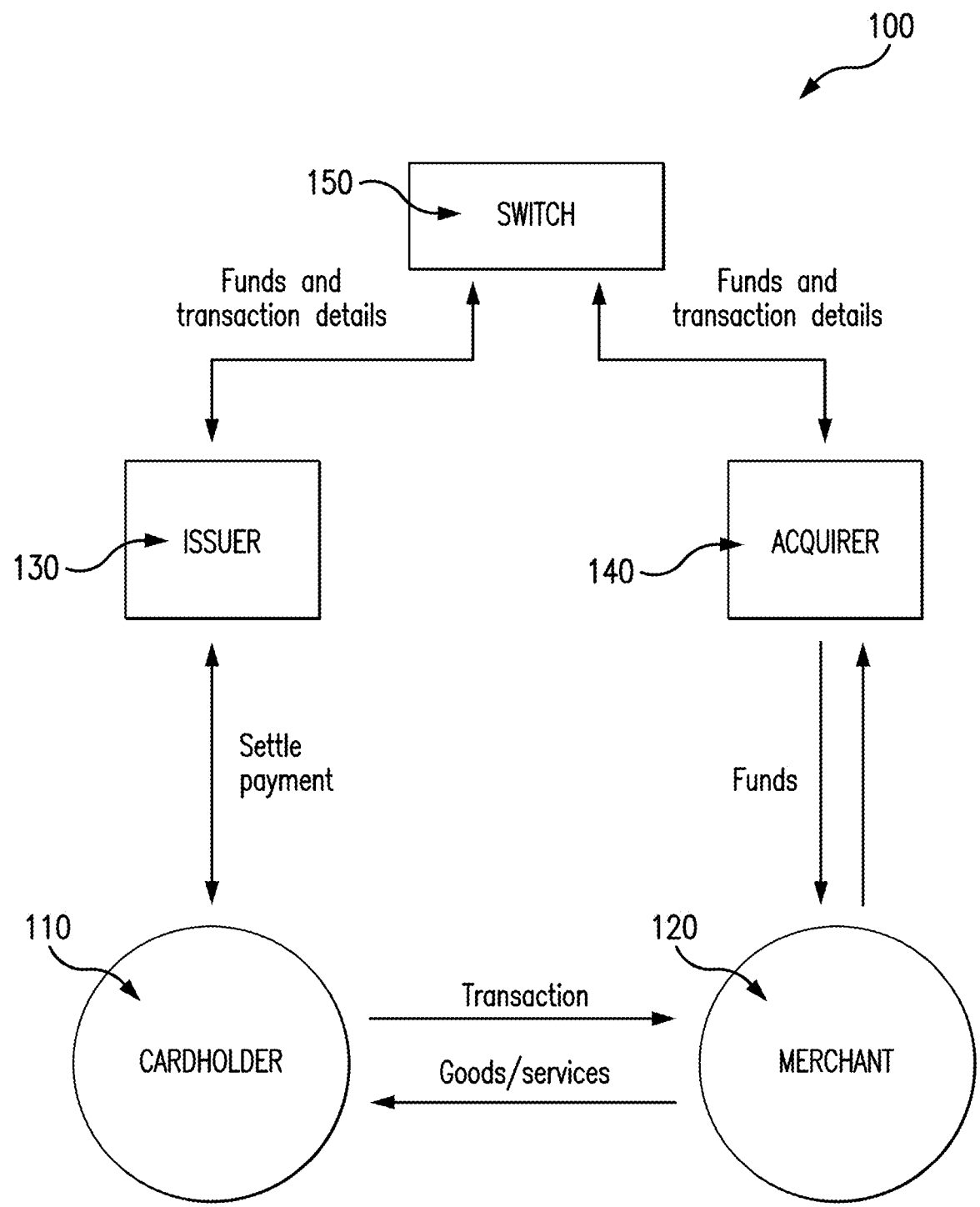
FIG. 3 shows schematically a distributed transaction architecture using a four party model.

FIG. 3 is a block diagram of a typical four-party model or four-party payment transaction scheme. The diagram illustrates the entities present in the model and the interactions occurring between entities operating in a card scheme.

Normally, card schemes—payment networks linked to payment cards—are based on one of two models: a three-party model or a four-party model (adopted by the present applicant). For the purposes of this document, the four-party model is described in further detail below.

The four-party model may be used as a basis for the transaction network. For each transaction, the model comprises four entity types: cardholder 110, merchant 120, issuer 130 and acquirer 140. In this model, the cardholder 110 purchases goods or services from the merchant 120. The issuer 130 is the bank or any other financial institution that issued the card to the cardholder 110. The acquirer 140 provides services for card processing to the merchant 120.

The model also comprises a central switch 150—interactions between the issuer 130 and the acquirer 140 are routed via the switch 150. The switch 150 enables a merchant 120 associated with one particular bank acquirer 140 to accept payment transactions from a cardholder 110 associated with a different bank issuer 130.

A typical transaction between the entities in the four-party model can be divided into two main stages: authorisation and settlement. The cardholder 110 initiates a purchase of a good or service from the merchant 120 using their card. Details of the card and the transaction are sent to the issuer 130 via the acquirer 140 and the switch 150 to authorise the transaction. The cardholder 110 may have provided verification information in the transaction, and in some circumstances may be required to undergo an additional verification process to verify their identity (such as 3-D Secure in the case of an online transaction). Once the additional verification process is complete the transaction is authorised.

On completion of the transaction between the cardholder 110 and the merchant 120, the transaction details are submitted by the merchant 120 to the acquirer 140 for settlement.

The transaction details are then routed to the relevant issuer 130 by the acquirer 140 via the switch 150. Upon receipt of these transaction details, the issuer 130 provides the settlement funds to the switch 150, which in turn forwards these funds to the merchant 120 via the acquirer 140.

Separately, the issuer 130 and the cardholder 110 settle the payment amount between them. In return, a service fee is paid to the acquirer 140 by the merchant 120 for each transaction, and an interchange fee is paid to the issuer 130 by the acquirer 140 in return for the settlement of funds.

In practical implementations of a four-party system model, the roles of a specific party may involve multiple elements acting together. This is typically the case in implementations that have developed beyond a contact-based interaction between a customer card and a merchant terminal to digital implementations using proxy or virtual cards on user computing devices such as a smart phone.

Figure 4:
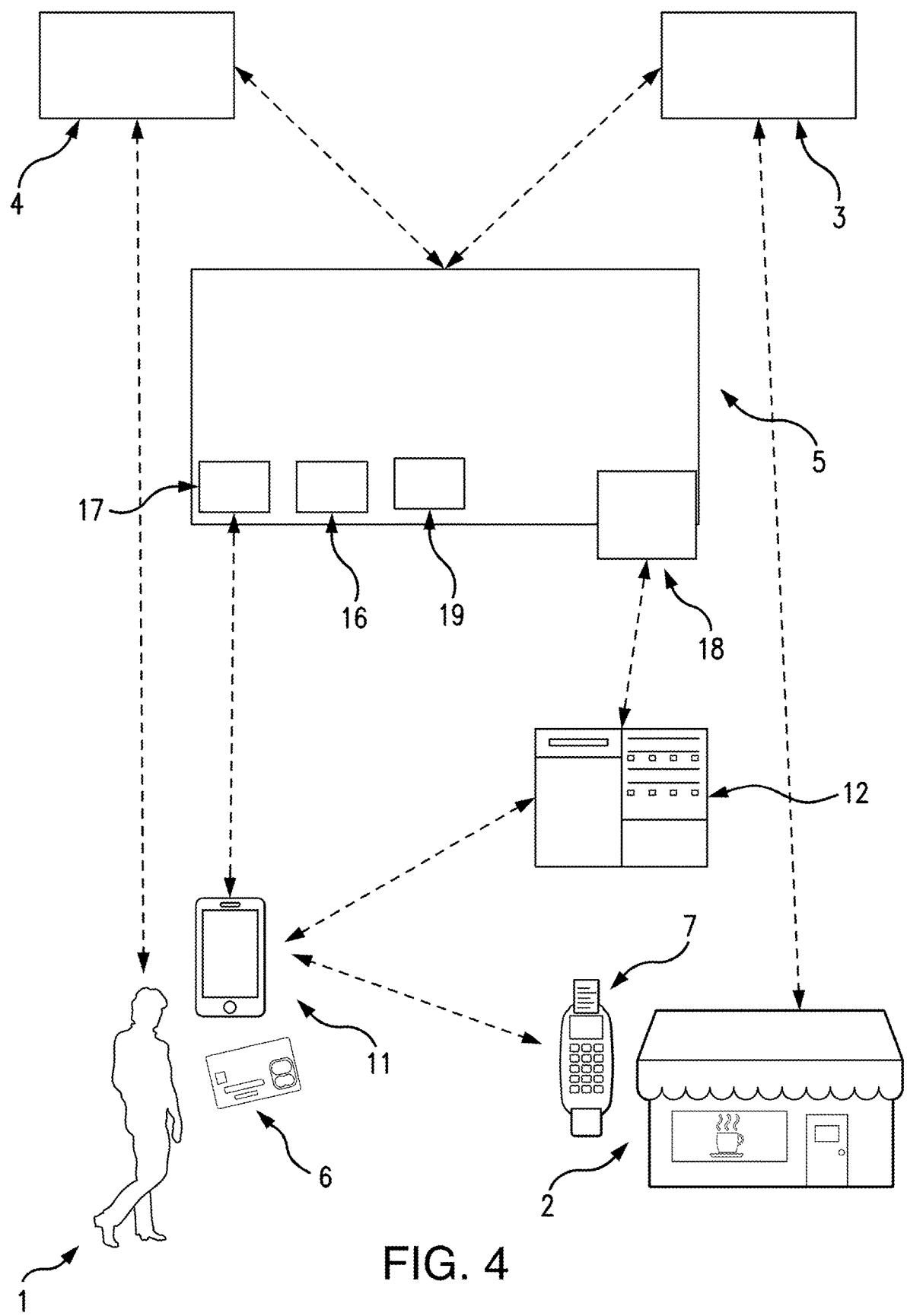
FIG. 4 illustrates elements of a complex distributed system adapted to implement the transaction architecture of FIG. 3.

FIG. 4 shows an architecture according to an embodiment of the disclosure appropriate for interaction between a cardholder and a merchant. This Figure shows a general purpose architecture for reference, but shows in particular elements of an architecture used when a cardholder carries out an online transaction with a merchant server.

For a conventional transaction, a cardholder will use their payment card 6—or a mobile computing device such as smartphone 11 adapted for use as a contactless payment device—to transact with a POS terminal 7 of a merchant 2. However, in embodiments relevant to the present invention, the cardholder will use his or her computing device—which may be any or all of a cellular telephone handset, a tablet, a laptop, a static personal computer or any other suitable computing device (here cellular telephone handset or smartphone 11 is shown)—and other computing devices such as a smart watch or other wearable device may also be used)—to act either as a proxy for a physical payment card 6 or as a virtual payment card operating only in a digital domain. The smartphone 11 may achieve this with a mobile payment application and a digital wallet, as described below. The smart phone 11 can use this to transact with a merchant POS terminal 7 using NFC or another contactless technology, or to make a payment in association with its wallet service as discussed below. However, online transactions with a merchant are of particular interest in connection with embodiments of the disclosure, rather than contact or contactless transactions with a merchant POS terminal 7. To make an online transaction, the smartphone 11 may also be able to interact with a merchant server 12 representing the merchant 2 over any appropriate network connection, such as the public internet—the connection to the merchant may be provided by an app or application on the computing device.

The transaction scheme infrastructure (transaction infrastructure) 5 here provides not only the computing infrastructure necessary to operate the card scheme and provide routing of transactions and other messaging to parties such as the acquirer 3 and the issuer 4, but also a wallet service 17 to support a digital wallet on the cardholder computing device, and an internet gateway 18 to accept internet based transactions for processing by the transaction infrastructure. In other embodiments, the wallet service 17 may be provided similarly by a third party with an appropriate trust relationship with the transaction scheme provider. To support tokenisation, a token service provider 19 is present (again, this is shown as part of transaction infrastructure 5 but may be provided by a third party with appropriate trust relationships), and the transaction scheme infrastructure provides a digital enablement service 16 to support the performance of tokenised digital transactions, and to interact with other elements of the system to allow transactions to be performed correctly—this digital enablement service may include other elements, such as token service provision.

For a tokenised transaction, the transaction is validated in the transaction scheme by mapping the cardholder token to their card PAN, checking the status of the token (to ensure that it is in date and otherwise valid) and any customer verification approach used. This allows the issuer to authorise the transaction in the normal manner.

Figure 5:
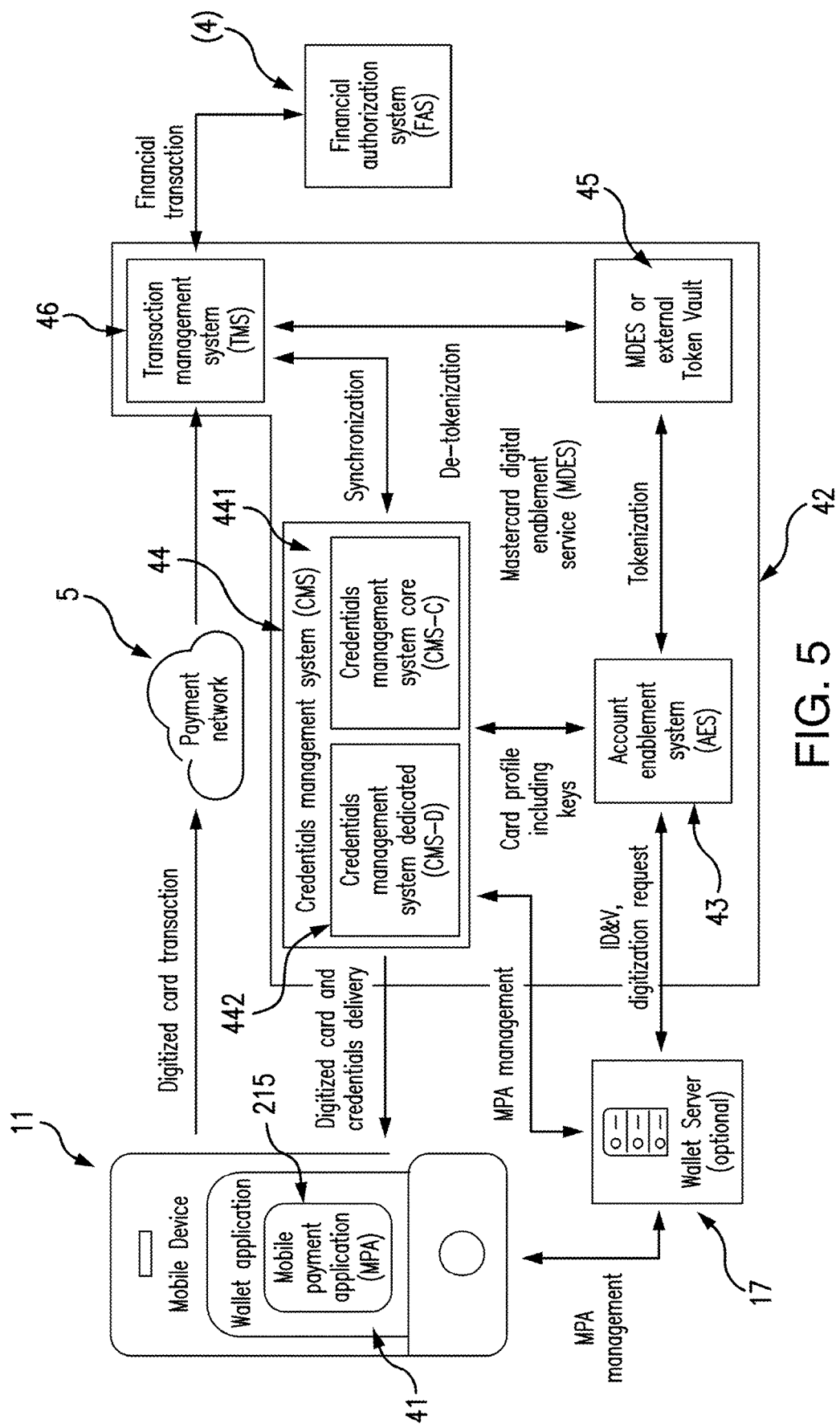
FIG. 5 shows schematically an exemplary system for enabling digital transactions in the transaction architecture of FIGS. 3 and 4.

FIG. 5 shows elements of a transaction infrastructure to support digitised payments from a mobile device in more detail. This Figure shows as a specific example the applicant's Mastercard Cloud Based Payment (MCBP) architecture—this is exemplary rather than specific to the invention, and illustrates how the architecture is used to support a mobile payment application 215 on a mobile device (such as smartphone 11)—here the mobile payment application 215 is shown as contained within a wallet application or digital wallet 41. Such a digital wallet 41 may communicate with a wallet server 17 to allow management of the mobile payment application, and it also can be used to request digitization of a payment card 6 to be used by the mobile device 11.

The Mastercard Digital Enablement Service (MDES) 42 performs a variety of functions to support mobile payments and digitized transactions. As indicated above, the MDES 42 is exemplary only—other embodiments may use digitisation, tokenisation and provisioning services associated with other transaction processing infrastructures, for example. The wallet server 17 is not a part of the MDES 42—and need not be present, for example if the mobile payment application 215 is not embedded within a digital wallet 41—but acts as an interface between the mobile device 11 and the MDES 42. The MDES 42 also mediates tokenised transactions so that they can be processed through the transaction scheme as for conventional card transactions. The following functional elements shown within the MDES 42: the Account Enablement System (AES) 43, the Credentials Management System (CMS) 44, the Token Vault 45, and the Transaction Management System (TMS) 46. These will be described briefly below.

The Account Enablement System (AES) 43 is used in card digitisation and user establishment. It will interact with the mobile payment application (here through the wallet server 17) for card digitisation requests, and will populate the Token Vault 45 on tokenisation and will interact with the CMS 44 to establish a card profile with associated keys for digital use of the card.

The Credentials Management System (CMS) 44 supports management of cardholder credentials, and is a key system within the MDES 42. The core system 441 manages synchronisation with the transaction system as a whole through interaction with the TMS 46 and manages the channel to the AES 43. The dedicated system 442 provides delivery of necessary elements to the mobile payment application such as the digitized card and credentials and keys in the form needed for use. This system may also interact with the wallet server 17 for management of the mobile payment application.

The Token Vault 45—which is shown here as within the MDES 42, but which may be a separate element under separate control—is the repository for token information including the correspondence between a token and the associated card. In processing tokenised transactions, the MDES 42 will reference the Token Vault 45, and tokenisation of a card will result in creation of a new entry in the Token Vault 45.

Transaction Management System (TMS) 46 is used when processing tokenised transactions. If a transaction is identified by the transaction scheme as being tokenised, it is routed to the TMS 46 which detokenises the transaction by using the Token Vault 45. The detokenised transaction is then routed to the issuer (here represented by Financial Authorisation System 47) for authorisation in the conventional manner. The TMS 46 also interacts with the CMS 44 to ensure synchronisation in relation to the cardholder account and credentials.

Embodiments of the disclosure are directed to enabling aspects of a system for the performance of a digitized transaction as shown in FIG. 5—and in particular the management of credentials—to be decentralized. This is done by replacing a central node with a decentralized set of nodes each capable of credential management, as is shown in FIGS. 6 to 8.

Figure 6:
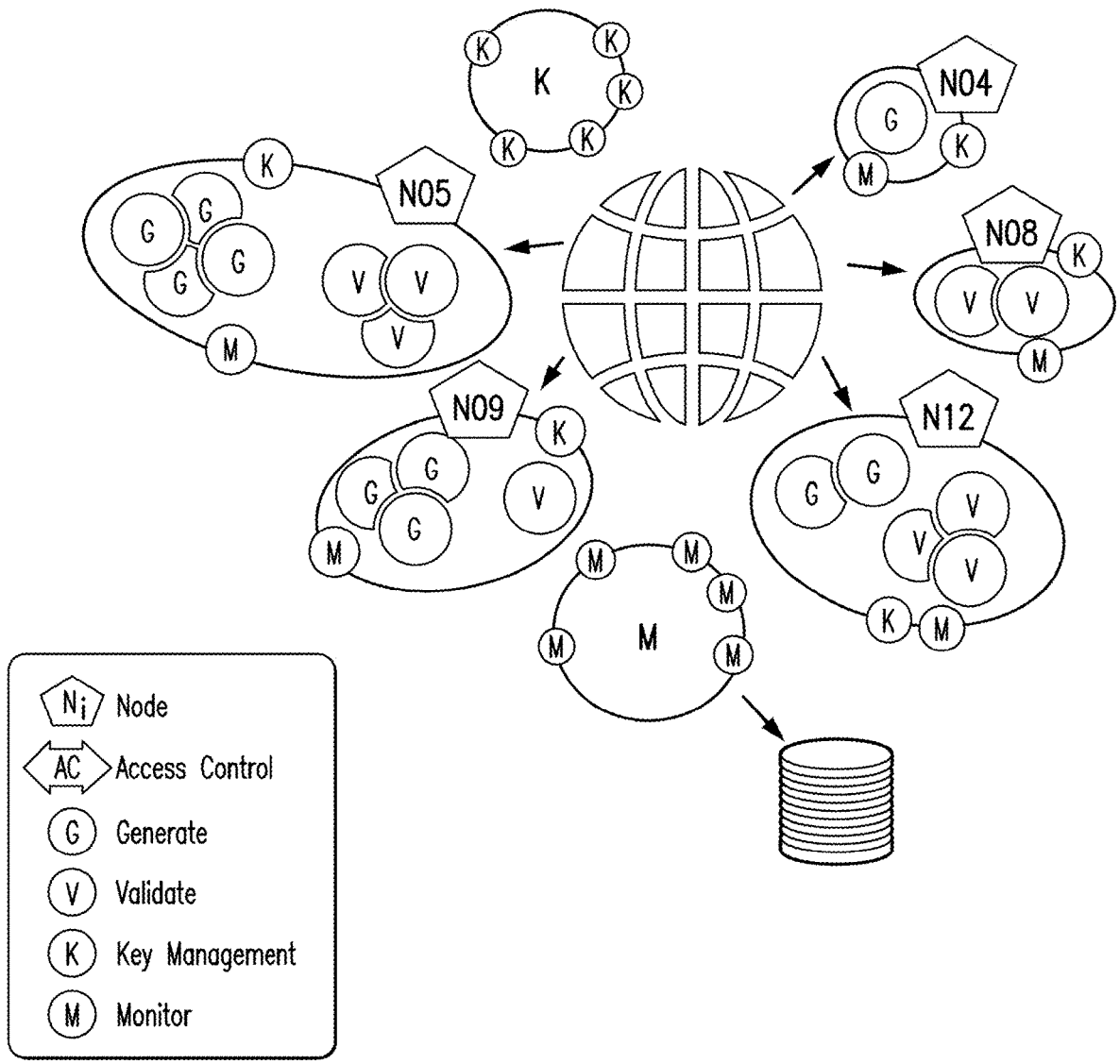
FIG. 6 illustrates schematically an arrangement for a distributed system for digital enablement of transactions.

FIG. 6 shows a decentralised system of computing nodes Nx, each capable of both generating G and validating V credentials. These credentials can be valid across the whole system (unless restricted to some nodes as result of on-soil regulation or the like), and in this case are associated with transactions for a set of users (clients) whose transactions are routed to that node, typically through geographic proximity. Nodes provide credential generation G and credential validation V as services to clients, and need to be able to generate the credentials securely and validate them securely while they are valid at least. In the architecture shown, credentials are not stored—they are generated on request and validated on the fly. As FIGS. 6 and 7 show, in addition to credential generation and validation, key management K and monitoring M can be considered as services both locally at a node and across the system, and access control AC will typically be required to allow access to a service. These aspects will all be described in more detail below.

Elements of a suitable computing node are shown in FIG. 8. The node 80 comprises at least one networking connection 81 to allow communication to clients 90 and other nodes 91 as well as (in this example) a central node 91*a*. Communication is shown here as being through separate networks to each set of other parties—through a first network cloud 92 for connection to clients, and a second network cloud 92*a* for connection to other nodes within the distributed system. This reflects that these networks may be physically different, or may have different security requirements and protocols.

The node 80 contains a plurality of conventional servers 83 (which will contain their own processors and memories—not shown—along with other components as would normally be found in a server) and a memory 84 containing a central database. Also comprised within the node 80 are a plurality of hardware security modules 85 (HSMs), adapted to hold cryptographic material and to perform cryptographic functions securely. Here elements within the node 80 are shown communicating by means of a bus 86. While the node 80 in this case is represented as a single data centre, this is not required—the "bus" may be, for example, comprise a dedicated network connection between a group of related data centres that allows them to provide a real-time response such that they will appear to other entities communicating with the node to be part of an integrated whole.

Existing procedures for credential management in payment systems are centralized—any request to create or validate credentials results in a query to a centralized system. For a payment system implementing EMV standards, credentials are generated using keys derived according to a hierarchical process. Issuer Master Keys (IMK) are associated with a specific range of tokens, and keys for use for credentials are derived hierarchically (Card Master Keys—CMK—from IMK, and then Session Keys—SK—from CMK). This approach is used for devices, such as physical cards, but is also used for digital transactions. The number of digital transactions is increasing extremely rapidly, as opposed to device based interactions where the growth is more consistent with resources.

In the digital ecosystem, while there is very rapidly increasing demand, there is also generally a more secure environment, as the interaction is typically between merchant systems (or payment service providers) and the transaction system over secure pathways between well-identified participants. There are thus interactions that may require multiple cryptographic operations for security in a device context that can be streamlined when delivering services in a server context when exposing API to access the services while keeping all the assets secure in a constrained environment including key management and cryptographic operations.

While it may appear desirable to scale a transaction system for performing digital EMV transactions by using a set of distributed servers to generate and validate credentials, it is found that this approach does not scale. The overall level of key generation would not be changed, but the amount of messaging within the system would be very greatly increased, as an extremely large number of tokens would need to be managed, and replicated. Processing would be demanding and also extremely expensive, as existing EMV key generation approaches require customised rather than off-the-shelf Hardware Security Modules (HSMs), and data storage and particularly network latency would become impossible to manage problems.

Embodiments of the disclosure support this distributed approach by replacing the binding of a token to a specific hierarchically derived key, allowing instead the first available key from a stack of keys to be allocated to a tokenized transaction. This approach, using flexible and dynamic key management, allows for a scalable solution. Monitoring can be carried out in such a way as to ensure that the distributed architecture is secure without requiring the transmission or replication of large quantities of sensitive information. This approach can also be carried out in a standard HSM using fully FIPS compliant processes—for example, DES and 3DES need not be used. This approach is described in more detail below.

At present, the device security model is also used for fully digital transactions. This security model involves Issuer Master Keys (IMKs) being stored in the transaction system HSMs and used to derive Card Master Keys (CMKs) from the relevant IMK and a card PAN (Primary Account Number). These CMKs are then stored in a device (typically a Secure Element or substitute technology). When using software-based solutions to generate transaction credentials using a mobile device, a Session Key (SK) is generated using the relevant CMK and an ATC (Application Transaction Counter) for the card/device—this is currently generated by the Credentials Management System (CMS) as shown in FIG. 5. At present, all tokens, even for fully digital transactions, are bound to this IMK/CMK/SK derivation. This also applies for transaction credentials generated by server through API exposed by the transaction system for remote payment transactions.

This approach requires a very heavy management load for keys, which is not appropriate for fully digital transactions, as is discussed below with reference to FIGS. 9 and 10. Generation of SKs, and hence Application Cryptograms (AC—a standard mechanism in EMV transactions) requires multiple cryptographic operations, not all of which can be carried out by a conventional off the shelf HSM, so bespoke HSMs are required. Massive distribution of keys across the system is required so that performance of a transaction can be supported wherever it occurs and ATC management is complex. It would be desirable to use standard HSMs, avoid massive key replication while having keys directly available for use, and to be able to provide a solution that limits the number of HSMs overall (as these typically support only a few thousand keys).

Much of this security is to provide assurance of security even if there is the possibility of compromise at a system endpoint (for example, at the cardholder device). Aside from this, security has a limited role, as shown in FIG. 9. The main purpose of the cryptographic function is to provide a guarantee—this covers both integrity of the data and authentication. The transaction related data protected by a cryptographic data includes identification of a transaction and the associated token, along with an indication of any cryptographic processes used and any relevant financial data (along with any other aspect of the transaction that needs to be guaranteed). This is represented by a transaction credential—this needs to be generated G and subsequently validated V, with these processes being monitored M to ensure overall system integrity and supported by a key management system K of some kind.

In the case of a fully digital transaction, these processes take place in a constrained environment where endpoint security is not an issue in the same way as with devices. As can be seen from FIG. 10, in this domain the token does not reach either of the endpoints of the conventional transaction management system—the cardholder or the issuer. Instead, it operates across a merchant system or a payment service provider (PSP) and transaction scheme provider.

This approach allows for decentralisation of the credential system from a complex central server into a number of nodes providing services. These nodes will typically be geographically distributed, but may extend over a number of data centres (for example, by use of a cloud infrastructure to achieve data sharing within a node). These nodes provide services—in relation to credentials, a generation service G and a validation service V—with defined rules for access control to the services. The merchant or PSP communicates with the generation service G to obtain credentials, which are then used in a standard authorisation process, with the validating service V being called upon where necessary to validate the credential. These services have access to the computing infrastructure (HSMs, databases) of a node. Monitoring M and key management K services are also provided—these may be centrally organised or comprise a mix of central and local functionality. All these services and their interrelationship are described in greater detail below.

Access control to services can be provided in an essentially conventional manner. A general set of controls can be defined for a node, with the possibility of local modification—for example, to meet local regulatory or other specific security requirements. This approach makes it easy to implement country-specific policies, for example, by constraining all traffic for a particular country to a particular set of nodes. Access control can be performed at more than one level (for example, for individual services, but also for a node), and there may be specific rules or checks for specific service types. Access control is potentially very granular, and may provide specific solutions in a versatile way—for example, it could be used to allow a given merchant to perform a maximum number of transaction credential generation operations during a defined time for a given token.

The key management mechanism shown in FIG. 11 illustrates how a limited number of keys can be allocated to a node while providing a deterministic process in order to pick a key to generate credentials. The same process can be used by a validation entity to determine the key that was used by the generator so that it can validate any cryptographic material that is part of the credentials submitted for validation.

For each node, the generation G and validation V services have access to a pool of HSMs. The HSMs contain keys that are each uniquely identified by a set of key identifiers (KeyId). KeyId may be a label, a value, an explicitly unique value such as a UUID, or anything else with appropriate properties. These KeyIds are stored in uniquely identified (Identifier) key lists—these key lists provide a list of relationships between an identifier (Id) and a stored key (KeyId).

The identifiers (Id) are what will be determined by the deterministic process in order to establish what key is to be used, as will be described further below.

The integrity of each key list is guaranteed using a seal (Seal)—if the key lists are provisioned from a central location, this may be applied by a trusted party associated with that central location. Several other distribution models can be supported using for example a trusted party being a local functionality instead of a central location. A node will typically have a number of key lists available, but with only one active for generating credentials (G) at a given time—it will however generally be necessary for the validation service (V) to be able to access any key list that may be associated with a credential that is still valid. Key rotation in this approach is extremely straightforward—it may simply involve replacement of the active key list with another key list. It is however very straightforward to tell which KeyId is needed to validate a credential—it will be determined fully by the node identifier and the reference of the key list. That information is part of the credential and is used as input to the deterministic process to pick a key from a list of keys.

FIG. 11 illustrates an exemplary arrangement for Node Ni, which has two generation services G able to generate credentials associated with transactions. At any given point in time, these services G will be required to use a given key list—say Key List A in the first instance. This uses the yellow 111 and blue 112 keys, so these keys must be loaded in the HSMs used by the generation services G. After the expiry of a period of time, the key rotation process may for example mandate the use of Key List B—this uses yellow 111 and blue 112 keys, but also the green 113 key, so the green 113 key must be loaded in the relevant HSMs if not already present. The specific key to be used is selected from the key list by the deterministic process, as will be discussed below—this will typically give a different result after key rotation, but this is not inevitably the case (for example, Id=2 or Id=6 would give the blue key before or after rotation). While the generation services G do not need Key List A after key rotation, the validation services V still do—they require access to any key list that relates to a potentially valid credential. The validation services V must be able to establish exactly which key was used to generate a credential by the generation services G in order to validate a credential.

The transaction related data to be protected cryptographically includes identification of the token associated with the transaction, but also identification of the transaction itself. For this, some kind of transaction identifier is required. At each node, the credential generation and validation services have access to a local database which can be used to manage such data. To ensure that transactions are managed effectively across the system, any generation of transaction credentials for a given token should be associated with a unique transaction identifier for each transaction. This may be a UUID or any appropriate identifier structure (such as a concatenation of an n bit node identifier, an e bit epoch time, and a c bit local counter).

The size of data to be carried in transaction credentials could however be reduced to a few digits by use of a local transaction counter. This could simply be stored in the local database of a node and the local (rather than a global) value incremented when a local generation service G generates a new token, a process shown in general terms in FIG. 12.

An exemplary process for identifying a key to use for a transaction will now be described with reference to FIG. 11. As indicated, at any given time a generation service G has access to a set of keys in local HSMs, and uses keys in accordance with its currently active key list. This key list is itself uniquely identified (by Identifier) and contains a list of entries which correspond to relationships between an identifier (Id) and a stored key, represented by KeyId. In the case of Key List A, there are ten entries, and each Id is a single integer.

There will be a deterministic process associated with a key list to determine which key will be associated with a given transaction. It need not be the same deterministic process for every key list, but it needs to be used consistently for that key list so that both generation and validation services will achieve the same result. To provide this association, the deterministic process should operate on information identifying the transaction, such as some kind of transaction identifier—in this case, the local transaction counter (LTC) is a particularly effective choice as this is conveniently available and easy to process.

There are many choices available for a function, but the simplest choice is a MOD operation—for example here, Id=LTC MOD 10 would be appropriate to provide a deterministic result which could point to any of the available values of Id. Any validation service V with access to the transaction counter value in transaction data (or any counter derived from that value) can then determine the logical key identifier that was used by the generation service G that generated the credential and access the correct stored key without any trial and error mechanism. Associating the deterministic process function (referred to below as keyList.GetIdFunction) to the attributes of a key list in this way allows a scalable solution that can accept any number of logical key identifiers for a given key list.

The HSM cryptographic function should be appropriate to ensure data integrity and authentication through credential generation and validation. The cryptographic function operates on the chosen transaction data, using the key, and provides an output which does not expose the key. Various alternative cryptographic functions could be used—HMAC is a particularly effective choice, but CMAC, CBC MAC are among possible alternatives. The cryptographic function used should be specified in the key list (as keyList.CryptoFunction) and is also driven by the capabilities of the HSMs used for generation and validation. On-soil regulations, cryptographic material export or other security considerations may lead to the choice of specific cryptographic functions.

Within the transaction data, there should be information representative of the application cryptogram generated during the transaction process. This may be a reduced form of the cryptogram—for example, in legacy environments (such as Mag Stripe or eCommerce) not able to carry any Digital Secure Remote Payment (DSRP) data (using EMV or UCAF field) this may be provided as the CVC2 field. This is significant as a validation service V must be able to access all the data used by a generation service G to generate a cryptogram—this will include the following:

dynamic information carried as part of the transaction flow;
  shared information from one of the following:
  replicated processes (such as management of the key lists);
system parameters for particular use cases.

Standard approaches for difference use cases—legacy transaction, UCAF and DPD field transactions—are discussed further below. Legacy transaction use cases provide a solution when the Merchant and/or the PSP are only able to manage PAN, Expiry Date and CVC2 as part of the transaction flow, and do not have access to more recent developments. The UCAF use case aims to leverage the more recently introduced Universal Cardholder Authentication Field to carry more data as part of the transaction flow. The DPD use case covers the introduction of Digital Payment Data, a container able to carry all the data needed as part of the transaction flow.

A full set of cryptographic mechanisms is shown in FIG. 13. Key management is discussed with reference to FIG. 14. There are two aspects to key management in this model: management of the keys themselves, including their generation and delivery to the HSMs associated with the nodes, and management of the key lists, including their generation, distribution, activation and deactivation. The key lists are sensitive assets while keys are considered as secret assets—the key lists define the keys to be used for generation and validation of cryptograms. Keys require end to end security with secure transport of the keys using wrapping/unwrapping techniques when loading the keys in HSMs. Their use should not be compromised by the key lists in case an attacker would like to change the content of a key list in order to alter the key selection process. The integrity of key lists is guaranteed by the seals—a seal is provided for a key list by the generating party or an associated trusted party, will involve a suitable cryptographic process (such as HMAC with an appropriate dedicated key or using for example a digital signature generated using asymmetric algorithms such as RSA, ECC, SM2 . . . ), and has the effect that any relevant part of the system can have confidence that the key list was generated by an appropriate party and has not been modified. In addition the key list seals can be used in the generation and validation of cryptograms to secure the credentials.

Different control models are possible. There may be centralized control, with a central service generating keys and key lists, and distributing these to the different nodes. There however also may be localised control if dedicated processes are required at a particular node. This may in particular apply if there are specific requirements for a particular country—for example, on-soil regulations or restrictions on export of cryptographic material. This may also apply if there is a proprietary mechanism needed for HMS management—for example, with a particular cloud service provider. This need not be node-limited—it could apply to regional control with a central service within a region (this may be particularly appropriate where there is a specific security model for a particular country to meet local legal requirements). There may also be a hybrid or composite model, in which some key and key list provisioning is central, whereas some is local—there may also be a distributed model in which distributed peers together assume the role of a central service.

Monitoring, which is discussed with relevance to FIG. 15, may have both local and central aspects. While both local and centralized monitoring are possible, a hybrid approach may be particularly effective in order both to provide effective detection of any issue and to produce reaction effective to counter risks associated with a fully distributed architecture.

There are three main categories of monitoring to be considered: integrity of the distributed system; generation of transaction credentials; and validation of transaction credentials. As transaction credentials may be generated or validated anywhere, it is important to have effective monitoring across the whole distributed system. Risks to be considered include misuse by an attacker of genuine transaction credentials generated by a generation service G in a node, in particular by an attempt to validate in multiple validation services in other nodes—this is an issue as a validation service V would typically not have real-time sight of actions taken by validation services V in other nodes of the distributed system.

While monitoring is important to maintain the integrity of the system, it is also important to limit the amount of messaging that results to ensure that the system is scalable and will not be overloaded by the monitoring process. A number of choices can be made to ensure an effective monitoring process. One is for the monitoring process M to be fed directly by the credential generation services G. Another is, that as any validation service V can validate transaction credentials, to have mutualised storage for all validation services V at any given node. This allows associated data management of the monitoring service M locally to provide an initial layer of defence, particularly against replay detection.

A local monitoring service may then be able to report via a central monitoring service (hub and spoke) or directly (peer to peer) to other nodes and hence to other validation services V as a second layer of defence to counter misuse of transaction credentials across nodes.

Validation services themselves obviously check whether transaction credentials are valid, and can cascade detection of any issues (such as a validation failure, excessive retries, and invalid transaction data or key list references)—these can be used to suspend a token across nodes. Additional controls, such as making random checks on validation of key list seals, can also be performed. Another monitoring process is correlation between different service types—here, generation G and validation V—to detect whether transaction credentials have been lost (by non-submission, abnormal generation, or otherwise). The use of cryptographic material may be followed to track that it is being appropriately used and that the system is appropriately configured—for example, the number of cryptographic operations using a given stored key may be tracked.

As indicated above, one principle to be followed in effective monitoring is to provide an effective solution without an excessive load on the distributed system. This can be done by supporting different levels of information (for example, local monitoring where appropriate, with only digests of local monitoring activity communicated further) and reduction of load with data replication and sharing.

Monitoring may be different from node to node, or from region to region, where there are specific requirements. Specific monitoring processes may be used at a given node or in a given region to address on-soil or personally identifiable information (PII) requirements in a given geography.

A challenge involved is in effectively identifying in a transaction how credentials have been generated in order to enable their subsequent validation—in particular, identification of which node generated the credential and which key list was used to do it, and the state of the local transaction counter. This is challenging, as transaction data is highly constrained, and to provide any of this information it will be necessary to change existing electronic transactions protocols (such as ISO 8583) or to repurpose existing fields.

For legacy electronic transactions protocols, fields that could in principle be repurposed are Primary Account Number (PAN), as some digits within the PAN may be implicit in the context of a transaction of this type and can be reused as a result, Expiry Date, where some information can be carried in a condensed format, and CVC2. Six bits could be released straightforwardly using the expiry date as a carrier, but this would not be sufficient—a node identifier would typically need at least four bits for any extended system, and one bit would probably not be sufficient for either a key list reference or a transaction counter.

One approach that could be used is to use a specific set of Bank Information Numbers (BINs), which form the first six digits in a PAN, to support the implementation described above—when one of these BINs is detected, special handling can be employed. This can involve associating a token with a number of PAN values. This model is shown in FIG. 16. An FPAN (Funding Primary Account Number—corresponding to a physical card account)—may be mapped to one or more tokens, but a specific token is associated with a particular technology. The top line shows a conventional tokenization process—an FPAN is associated with single token. Where the approach described above is used, the token may be associated with nine PAN values for a legacy EMV use case (bottom line), though as will be described below, for certain new formats a one to one mapping may still be used.

Reuse of transaction fields in the legacy case can thus be as follows. For PAN, 14 digits can be used for full identification of the token, with 1 digit for the counter associated to the token for a given number, and one to the Luhn number (which needs to be retained as a checksum to ensure valid numbers are used). The 6 bits of the expiry date can be repurposed with x bits used to identify the node and y bits used to refer to the relevant key list for that node. CVC2 provides three digits which can be used for the cryptogram.

For security, it is desirable to change key lists on a regular basis to ensure system security against attacks. It is also important to be able to allow validation of credentials for a period after they have been created—a suggested approach is to allow validation of credentials for up to 24 hours after creation. If this is combined with a key rotation process that operates every 24-36 hours, this means that while the generation process will only ever have one active key list for a given node, the validation process will only need to consider two key lists (the one currently active for credential generation and the one active immediately before it). Using the established deterministic process based on the transaction counter thus establishes the key to be used. This type of binary information (i.e. one or the other) can be typically coded using one bit of information. The cryptogram plays a key role in protecting the integrity of the transaction—successful validation of a cryptogram computed over a given set of data using a correct key confirms that data originally used in credential generation is genuine. Any failure in the validation process can come from the use of wrong cryptographic material and/or corrupted transaction data.

An exemplary key rotation process for this legacy arrangement is shown in FIG. 17. First of all, new keys are provided to the HSMs as needed—this may be by distribution from a central source, or by another key generation process, for example by local key generation. A new key list is then generated—this may involve existing keys and new keys—here, most slots in the key list involve existing keys in new positions in the key lists (though it may also be possible for a key to remain in the same position in a key list—as shown here for key list positions 2 and 6), though a new key has also been used in positions 3, 7 and 8. Again, this may be a central process, one managed by peers in a distributed network, or one managed locally. The new key list is distributed to any validation service eligible to validate and to the single generation service that is to use it to generate. The new key list is then activated in the validation services, and then activated in the generation service, which automatically deactivates the previously active key list in that generation service—the key rotation process is complete at this point. After 24 hours, the previous key list is then deactivated for the validation services. This approach works well with the limited space available for legacy cases—a single bit can just be toggled to indicate which key list is used.

One potential issue is that the number of transactions carried out for a given token appears limited by the space available to carry the transaction counter. One solution is to increase the space available for the transaction counter, but this will correspondingly limit the number of tokens available (as this is the only place where the additional bit can come from). Another possibility would be for a "retry" process to be used if validation has originally failed to recover a "full counter" value where this was greater than the original space available and has only been stored as a modulo value. These two approaches can be combined. It may also be possible to introduce different rules for different token ranges.

In each node, each generation (G) and validation (V) service has access to a local database. Any generation of transaction credentials for a given token is associated to a unique transaction identifier for each transaction. A local transaction counter (LTC) is managed by "G" for a given token in a given node. The same process applies at the time of validation by "V". This information is carried in the PAN field (digit 15, or digits 14 and 15) with a retry flag in the expiry date field, with a "full counter" generated if necessary if LTC is at a higher value. It is however important to set a limit on the number of cryptograms that can be generated by G and validated by V for a given token for a given node for a given key list to ensure effective access control—this value "MaxTransactionCounter" may be stored in the key list and protected by the key list seal.

Cryptographic processes for this legacy case are shown in FIG. 18. In this case, HMAC is chosen as the cryptographic function as this allow the use of general purpose HSMs while delivering effective functionality. Identification of the token uses the PAN value. Identification of the transaction takes information from the expiry date (EMV field DE14)—specifically the node identifier and the reference, possibly also with a retry flag—and from the PAN field, which holds the counter. Identification of the key and the cryptographic method is provided from the counter (which establishes which key is chosen from the key list) together with information shared by the key management system in the key lists. A variety of fields defining the transaction may be used as financial data to be used to generate the cryptogram (as shown in FIG. 18), with all these fields used to generate the cryptogram, which is then decimalised and the three least significant digits used in the CVC2 field.

As the skilled person will appreciate, some variation to these protocols is possible to prioritise certain choices or priorities. For example, it may be considered desirable to find a more effective way to carry data such as the Local Transaction Counter which did not require the use of a retry process—as can be seen from FIG. 19, the process shown above allows the use of at most two digits of the PAN for the transaction counter (and the use of two digits limits the number of tokens that can be provided), with a reduced cryptogram held in the three CVC digits. A different approach would be by using only two digits, rather than three, of the CVC field from the cryptogram, with the other digit used for holding the rightmost digit of the Local Transaction Counter. This could be provided in a more dynamic fashion by rearranging the three digits into a different order—this could be done by adding a CVC coding table to the key list, so that when the key list is used the coding table—also protected by the seal—determines the coding to be selected for providing the CVC2 field. The code may be selected by any value known by both the G and V services—for example, the Luhn number of the PAN. A new key list may then use a completely different coding table, making the process significantly dynamic.

This arrangement is shown in FIG. 20. The PAN digits identify the token and also provide a Luhn number, and the Luhn number is used to determine the ordering of digits for the CVC field—in this case, option 3 is chosen, indicating the least significant digit and next least significant digit of the cryptogram in the first two places, with the least significant digit of the counter in the third place. This results in a CVC output that can be derived by both the G and V services.

If more recent versions of electronic transaction protocol are used, then there are other fields available which may be used to carry more information. For example, where the Universal Cardholder Authentication Field (UCAF) is available, a number of additional digits are usable, which allow compromises used in the legacy case to be avoided. This approach may liberate a further 21 bytes of data to carry data as part of the transaction flow. This is sufficient to allow a full local transaction counter value to be carried, avoiding the need for any retry mechanism. More cryptographic material can be used—8 bytes of cryptogram, rather than 2 or 3 digits, A larger number of nodes can be used without node identification becoming a problematic issue because of limited available space in transaction data as defined in electronic transaction protocol requirements. It may also be possible to rotate key lists more frequently than 24 hours, as there is the space to use more than one bit for key list identification for validation services. Additional features can be delivered leveraging the available space in transaction data, for example by supporting merchant locking techniques (when the transaction is effectively bound to a given merchant using some form of merchant identification), by including additional components in the cryptographic process such as by using some random element or seed between the generator and the validator, or by taking additional measures to provide full compliance with any regulatory requirements.

As can be seen from FIG. 21, using a new layout for the content of UCAF (e.g. Format 7) there are 21 bytes available. One byte can be split between a version identifier and a codebook to specify conditional data used in cryptogram generation. A full byte can be used to hold the Local Transaction Counter—this means that a generation service G will be able to generate up to 255 cryptograms per key list for a given node for a given token, which should prevent the need for a retry counter and address the need of transaction credentials before a new key list is activated. A further byte is sufficient for node identifier data and a key list reference, which leaves a full 10 bytes for conditional data to be used in cryptogram generation and/or validation—with each use case associated with a value in the codebook—allowing use of different data than that carried in the authorisation message (data carried can include an unpredictable number used for the transaction, merchant data such as merchant type and card acceptor or acquiring institution ID codes, amount related information . . . ). 8 bytes can be used for a truncated cryptogram, thus significantly increasing security. FIG. 22 indicates how the cryptographic processes differ from what is shown in FIG. 18—the PAN, LTC, Node Identifier and Reference can all easily be included, and additional information can be provided in the encrypted data, such as additional transaction fields, the codebook and other conditional data.

This approach offers various further possibilities. The provision of an additional bit for key list reference allows for twice as frequent key list rotation. While some requirements remain—such as the need to limit the number of cryptograms generated by a service G for a given token for a given node for a given key list—others are waived (the presence of the full LTC means that there is no need for any retry process). It should be noted that a key list may be restricted to a particular use case—legacy, UCAF or DPD—and this may be used to determine the specific limit for the transaction counter for the assigned use case.

A new format called DPD (Digital Payment Data) is to be introduced shortly—this would provide even further options, as shown in FIG. 23. DPD could carry the UCAF to credentials as described above. In the first option, a unique identifier (such as a UUID) could be defined by a generation service at the time of transaction creation, and added to the list of data used in the cryptographic process—this allows transaction credentials to be tracked end-to-end independently of transaction details providing monitoring and fraud prevention benefits. In the second option, a much larger codebook can be used, along with extended identification of nodes, storage of more conditional data and use of a standard truncated cryptogram as used in other transaction flow—along with a UUID as for the first option.

As the skilled person will appreciate, the embodiments described above are exemplary, and further embodiments falling within the spirit and scope of the disclosure may be developed by the skilled person working from the principles and examples set out above.

The invention claimed is:

1. A computing node in a distributed information security system, the computing node comprising a hardware security module (HSM) to store a plurality of keys,
    wherein the computing node is adapted to communicate with a subset of clients of the distributed information security system,
    wherein the computing node provides at least one cryptographic service for the subset of clients,
    wherein the computing node is provisioned with the plurality of keys for use by the at least one cryptographic service,
    wherein the computing node is adapted to associate a key from the plurality of keys to a service request for a client according to a deterministic process based on one or more data associated with the client,
    wherein the computing node is adapted to provide a local monitoring service to monitor the at least one cryptographic service, the local monitoring service to track a number of cryptographic operations using a given stored key and to detect whether transaction credentials have been lost, and
    wherein the local monitoring service reports to a central service remote from the computing node or to another computing node in a peer-to-peer relation, the central service or the another computing node to provide a second layer of defense to any detected misuse or loss of the transaction credentials.

2. The computing node of claim 1, wherein the deterministic process allows the same key to be associated with another service request when the deterministic process is based on the same one or more data associated with the client.

3. The computing node of claim 1, wherein a service request from an authorized client relates to generation or validation of a credential.

4. The computing node of claim 1, wherein the deterministic process selects the key from a key list.

5. The computing node of claim 4, wherein the key list is sealed with a cryptographic key list seal.

6. The computing node of claim 4, wherein the key list has a limited period of validity, and the computing node is adapted to replace the key list with another key list when the key list is no longer valid.

7. The computing node of claim 6, wherein another key list is provided by a central service remote from the computing node, generated locally or provided by a peer node.

8. The computing node of claim 6, wherein the period of validity relates to generation of a credential but not to validation of a generated credential.

9. The computing node of claim 4, wherein the at least one cryptographic service uses not only the key but one or more other information items from the key list.

10. The computing node of claim 1, wherein the computing node comprises a plurality of service processes adapted to respond to service requests.

11. The computing node of claim 1, wherein the computing node lies within a transaction processing system and the service requests relate to the processing of transactions.

12. The computing node of claim 3, wherein a transaction identifier is or is comprised within the client data.

13. The computing node of claim 12, wherein a local transaction counter is used to provide the transaction identifier.

14. The computing node of claim 1, wherein the at least one cryptographic service comprises a plurality of services having different service types, and wherein the local monitoring service detects whether transaction credentials have been lost via correlation between the different service types.

15. The computing node of claim 1, wherein the local monitoring service reports to the central service or the another computing node by providing a digest of local monitoring activity.

16. A method of providing a cryptographic service at a computing node of a distributed information security system for a subset of the clients of the distributed information security system, the computing node comprising a hardware security module (HSM) to store a plurality of keys, wherein the method comprises:
 establishing communication with a subset of clients of the distributed information security system;
 establishing the plurality of keys for use by the at least one cryptographic service;
 associating a key from the plurality of keys to a service request for a client according to a deterministic process based on one or more data associated with the client, and
 providing a local monitoring service to monitor the at least one cryptographic service, the local monitoring service to track a number of cryptographic operations using a given stored key and to detect whether transaction credentials have been lost,
 wherein the local monitoring service reports to a central service remote from the computing node or to another computing node in a peer-to-peer relation, the central service or the another computing node to provide a second layer of defense to any detected misuse or loss of the transaction credentials.

17. The method of claim 16, wherein the deterministic process allows the same key to be associated with another service request when the deterministic process is based on the same one or more data associated with the client.

18. The method of claim 16, wherein another key list is generated locally or provided by a peer node.

19. The method of claim 16, wherein the at least one cryptographic service comprises a plurality of services having different service types, and wherein the local monitoring service detects whether transaction credentials have been lost via correlation between the different service types.

20. The method of claim 16, wherein the local monitoring service wherein the local monitoring service reports to the central service or the another computing node by providing a digest of local monitoring activity.

* * * * *